United States Patent
Lee et al.

(10) Patent No.: US 12,500,729 B2
(45) Date of Patent: Dec. 16, 2025

(54) METHOD AND APPARATUS FOR PERFORMING NR SIDELINK COMMUNICATION ON LTE CARRIER

(71) Applicant: LG ELECTRONICS INC., Seoul (KR)

(72) Inventors: Seungmin Lee, Seoul (KR); Hanbyul Seo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 379 days.

(21) Appl. No.: 18/040,477

(22) PCT Filed: Aug. 9, 2021

(86) PCT No.: PCT/KR2021/010507
§ 371 (c)(1),
(2) Date: Feb. 3, 2023

(87) PCT Pub. No.: WO2022/031147
PCT Pub. Date: Feb. 10, 2022

(65) Prior Publication Data
US 2023/0299935 A1    Sep. 21, 2023

Related U.S. Application Data

(60) Provisional application No. 63/067,787, filed on Aug. 19, 2020, provisional application No. 63/063,205, filed on Aug. 7, 2020.

(51) Int. Cl.
*H04W 4/00*    (2018.01)
*H04L 5/14*    (2006.01)
*H04L 27/26*   (2006.01)

(52) U.S. Cl.
CPC ...... *H04L 5/1469* (2013.01); *H04L 27/26025* (2021.01)

(58) Field of Classification Search
CPC ... H04L 5/1469; H04L 27/26025; H04L 5/14; H04L 5/0007; H04W 72/04;
(Continued)

(56) References Cited

U.S. PATENT DOCUMENTS

| | | | |
|---|---|---|---|
| 9,923,690 B2 * | 3/2018 | Ekpenyong | H04L 5/1438 |
| 10,631,254 B2 * | 4/2020 | Lee | H04L 25/03006 |
| 10,813,150 B2 * | 10/2020 | Nory | H04L 5/0032 |
| 12,052,195 B2 * | 7/2024 | Wang | H04L 5/0007 |

(Continued)

FOREIGN PATENT DOCUMENTS

| KR | 10-2017-0031174 | 3/2017 |
|---|---|---|
| KR | 10-2017-0112945 | 10/2017 |

(Continued)

OTHER PUBLICATIONS

PCT International Application No. PCT/KR2021/010507, International Search Report dated Nov. 18, 2021, 4 page.

*Primary Examiner* — Phuongchau Ba Nguyen
(74) *Attorney, Agent, or Firm* — LEE, HONG, DEGERMAN, KANG & WAIMEY

(57) ABSTRACT

A method that includes receiving a first time division duplex uplink-downlink (TDD UL-DL) configuration related to LTE, obtaining a second TDD UL-DL configuration related to NR sidelink communication, on the basis of the first TDD UL-DL configuration, and performing the NR sidelink communication with a second apparatus on a carrier related to the LTE, on the basis of the second TDD UL-DL configuration. The first TDD UL-DL configuration may include an UL subframe, a DL subframe, and a special subframe, and the special subframe may include a downlink pilot time slot (Dwpts) symbol, an uplink pilot time slot (Uppts) symbol, and a gap symbol. The NR sidelink communication is (Continued)

allowed for the first device in a first symbol, based on the Uppts symbol and the gap symbol overlapping with the first symbol.

15 Claims, 21 Drawing Sheets

(58) Field of Classification Search
CPC ... H04W 92/18; H04W 72/0446; H04W 4/40; H04W 88/06; H04W 28/04; H04W 72/042; H04W 88/08; H04W 28/08; H04W 28/084; H04W 36/22; H04W 72/12

See application file for complete search history.

(56) References Cited

U.S. PATENT DOCUMENTS

| | | | |
|---|---|---|---|
| 2019/0090218 A1* | 3/2019 | Noh | H04W 88/06 |
| 2019/0281612 A1* | 9/2019 | Ma | H04L 5/0094 |
| 2019/0379569 A1* | 12/2019 | Chae | H04J 11/0073 |
| 2020/0304265 A1* | 9/2020 | Kim | H04B 7/2615 |
| 2020/0305127 A1* | 9/2020 | Huang | H04W 72/02 |
| 2021/0168764 A1* | 6/2021 | Su | H04W 52/52 |
| 2023/0146718 A1* | 5/2023 | Lei | H04W 72/25 370/329 |

FOREIGN PATENT DOCUMENTS

| | | |
|---|---|---|
| KR | 10-2020-0007918 | 1/2020 |
| WO | 2019-054757 | 3/2019 |
| WO | 2020-029692 | 2/2020 |

\* cited by examiner (a)

◪ : PSSCH  ◩ : PSCCH (b)

◪ : PSSCH  ◩ : PSCCH (c)

◪ : PSSCH  ◩ : PSCCH

FIG. 15 performing NR sidelink communication
with a first device on a carrier related to LTE — S1510

METHOD AND APPARATUS FOR PERFORMING NR SIDELINK COMMUNICATION ON LTE CARRIER

CROSS-REFERENCE TO RELATED APPLICATION(S)

This application is the National Stage filing under 35 U.S.C. 371 of International Application No. PCT/KR2021/010507, filed on Aug. 9, 2021, which claims the benefit of U.S. Provisional Application No. 63/063,205, filed on Aug. 7, 2020, and 63/067,787, filed on Aug. 19, 2020, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, in NR sidelink communication, in order for a UE to perform NR sidelink communication on an LTE time division duplex (TDD) carrier, the UE must be able to perform NR sidelink communication based on LTE TDD UL-DL configuration. In this case, a method for a UE to obtain the NR TDD UL-DL configuration based on the LTE TDD UL-DL configuration may be required.

In one embodiment, a method for performing wireless communication by a first device is proposed. The method may comprise: receiving a first time division duplex uplink-downlink configuration (TDD UL-DL configuration) related to LTE; obtaining a second TDD UL-DL configuration related to NR sidelink communication based on the first TDD UL-DL configuration; and performing the NR sidelink communication with a second device on a carrier related to the LTE based on the second TDD UL-DL configuration. For example, the first TDD UL-DL configuration may include a UL subframe, a DL subframe and a special subframe. For example, the special subframe may include a downlink pilot time slot (Dwpts) symbol, an uplink pilot time slot (Uppts) symbol and a gap symbol. For example, the NR sidelink communication may be allowed for the first device in a first symbol, based on the Uppts symbol and the gap symbol related to the first TDD UL-DL configuration overlapping with the first symbol related to the second TDD UL-DL configuration.

In one embodiment, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: receive a first time division duplex uplink-downlink configuration (TDD UL-DL configuration) related to LTE; obtain a second TDD UL-DL configuration related to NR sidelink communication based on the first TDD UL-DL configuration; and perform the NR sidelink communication with a second device on a carrier related to the LTE based on the second TDD UL-DL configuration. For example, the first TDD UL-DL configuration may include a UL subframe, a DL subframe and a special subframe. For example, the special subframe may include a downlink pilot time slot (Dwpts) symbol, an uplink pilot time slot (Uppts) symbol and a gap symbol. For example, the NR sidelink communication may be allowed for the first device in a first symbol, based on the Uppts symbol and the gap symbol related to the first TDD UL-DL configuration overlapping with the first symbol related to the second TDD UL-DL configuration.

A UE can efficiently perform SL communication.

BRIEF DESCRIPTION OF THE DRAWINGS

FIG. 15 shows a method for a second device to perform NR sidelink communication with a first device on an LTE-related carrier according to an embodiment of the present disclosure.

DESCRIPTION OF EXEMPLARY EMBODIMENTS

Figure 1:
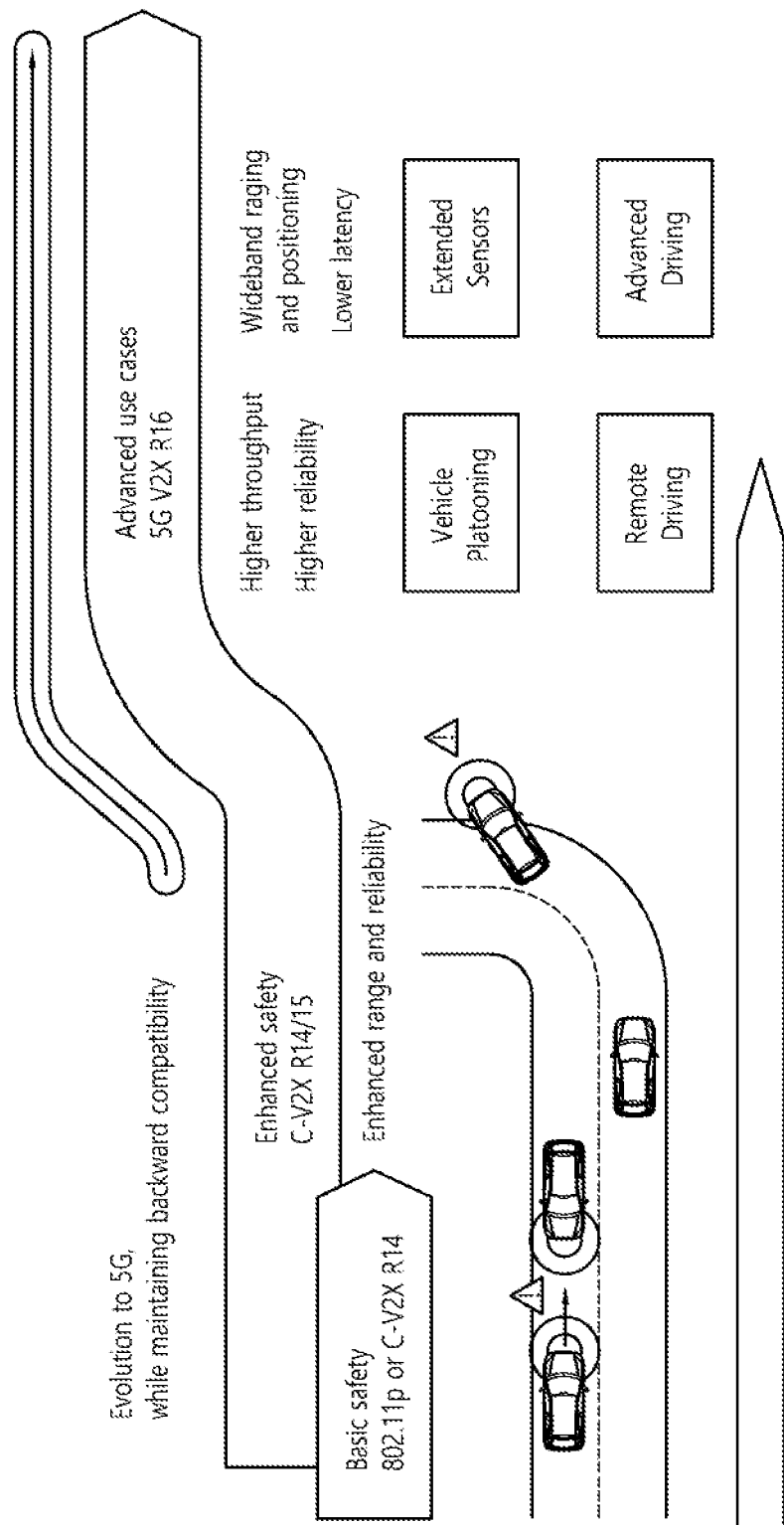
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
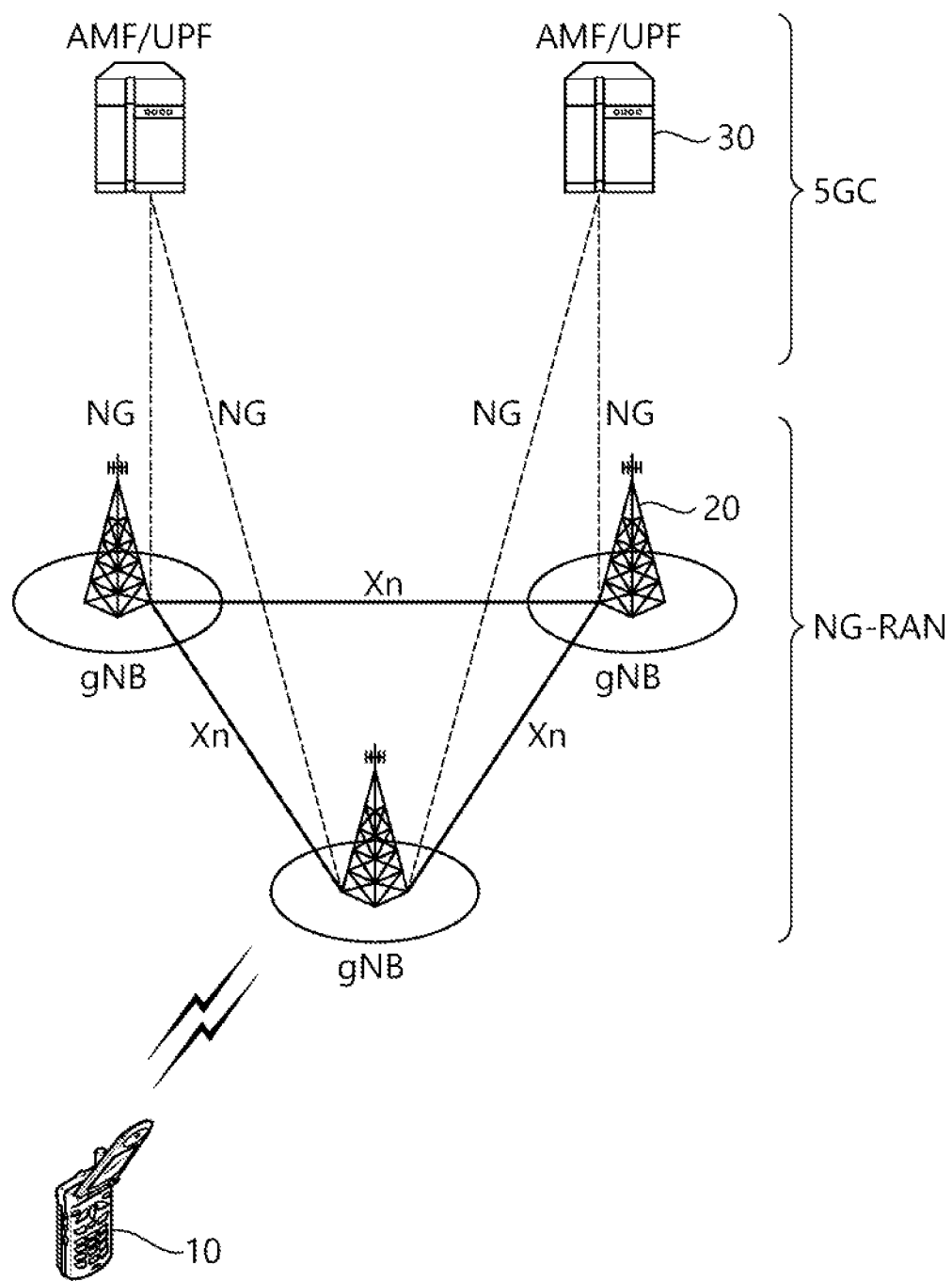
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
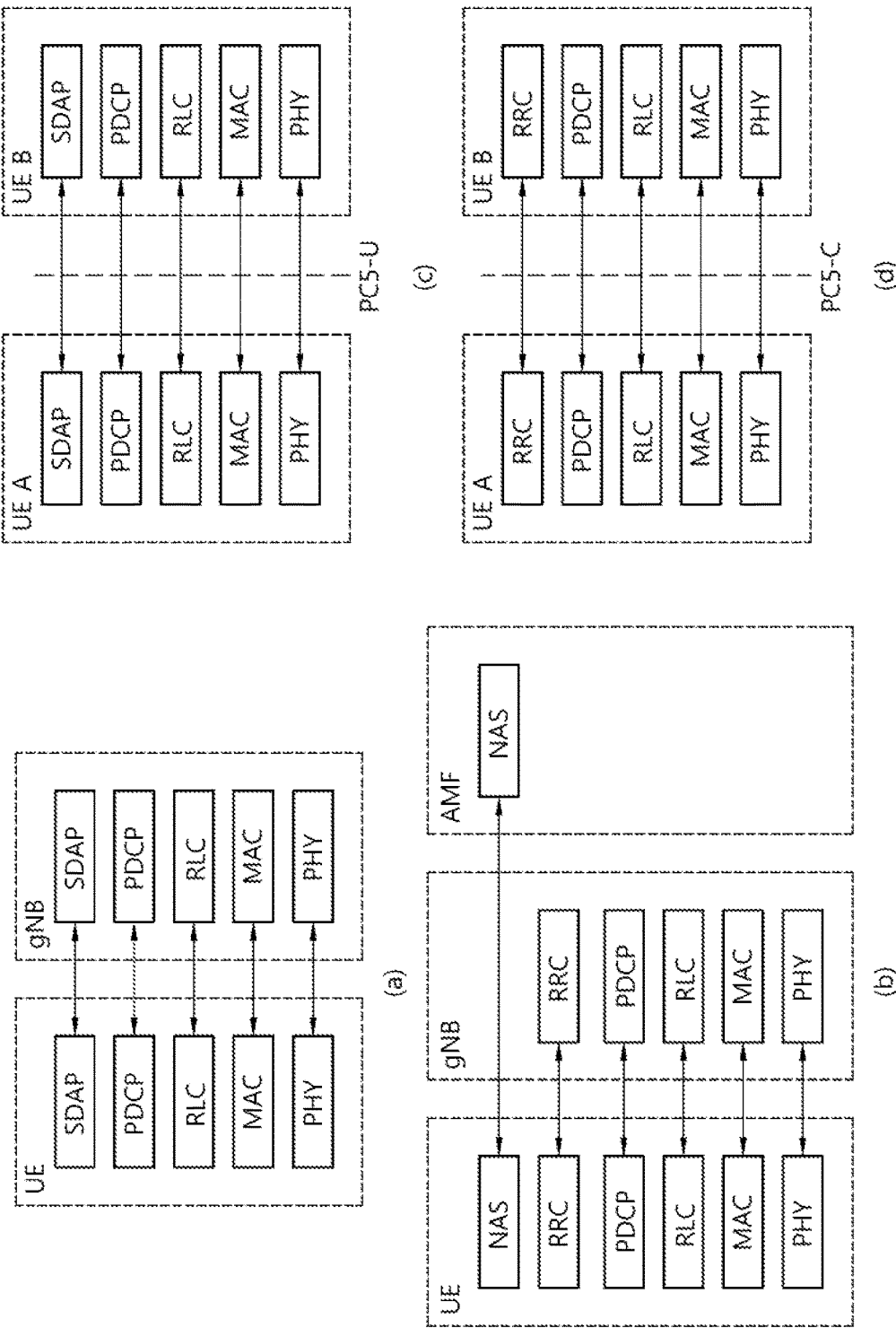
FIG. 3 shows a radio protocol architecture, in accordance with an embodiment of the present disclosure.

FIG. 3 shows a radio protocol architecture, in accordance with an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a upper layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC INACTIVE state is additionally defined, and a UE being in the RRC INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
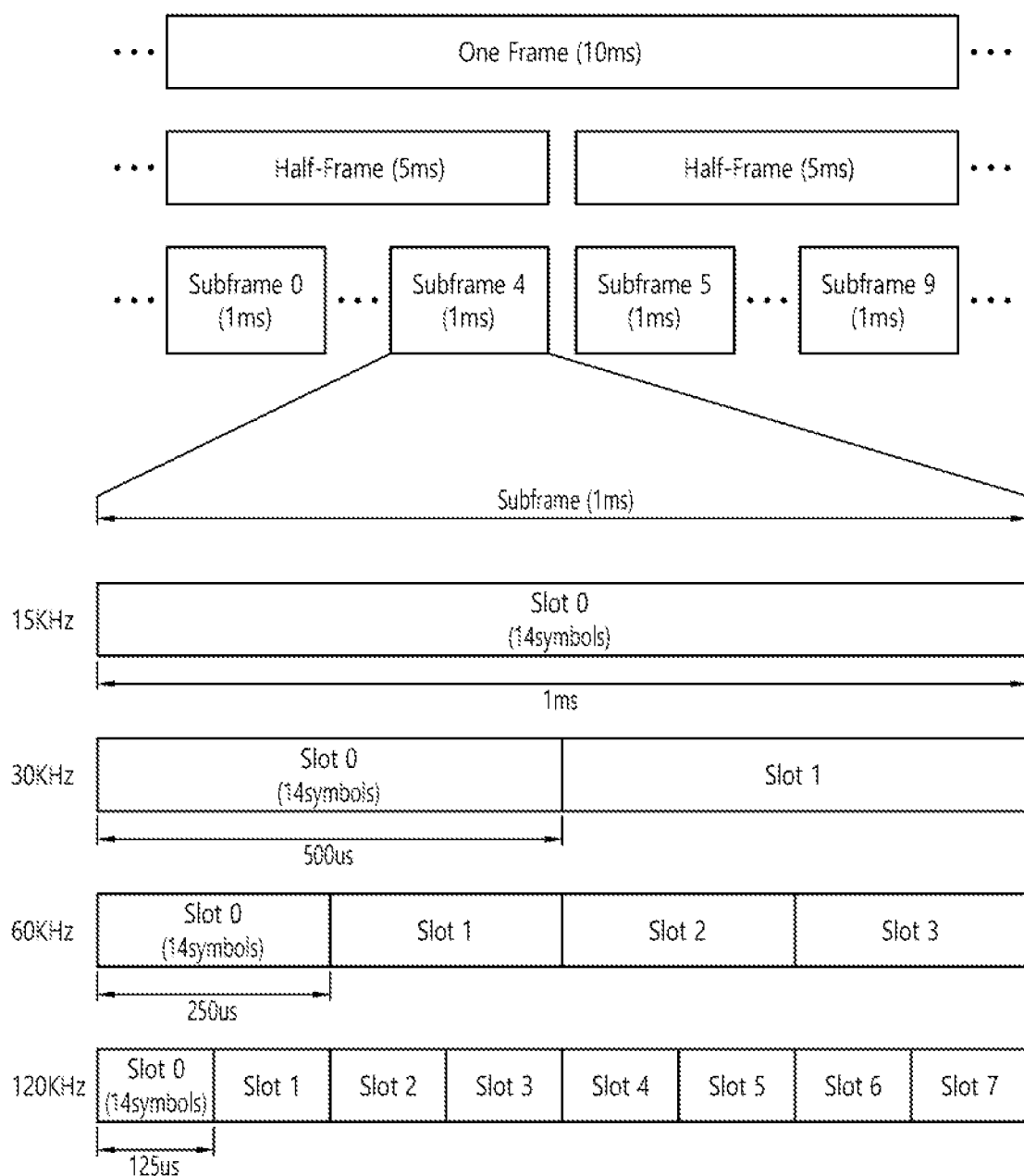
FIG. 4 shows a structure of a radio frame of an NR, in accordance with an embodiment of the present disclosure.

FIG. 4 shows a structure of a radio frame of an NR, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
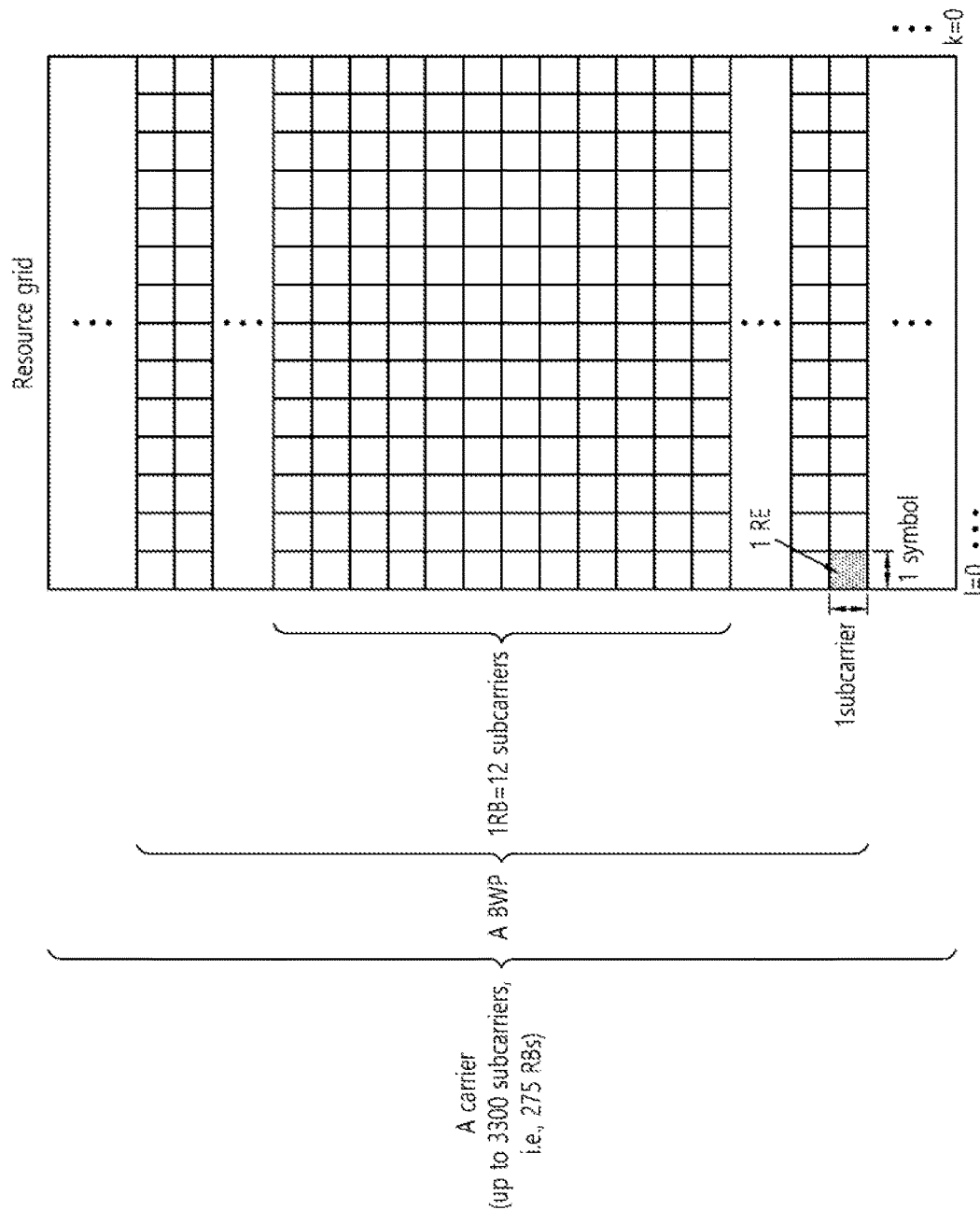
FIG. 5 shows a structure of a slot of an NR frame, in accordance with an embodiment of the present disclosure.

FIG. 5 shows a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

Meanwhile, in 5G, slots or mini-slots may be defined to have various transmission formats, and may be classified into the following formats.

DL only slot or full DL slot: A DL only slot consists of only a DL period, and only DL transmission is supported.

DL centric slot: A DL centric slot consists of a DL period, a GP (or flexible symbol), and an UL period, and the number of OFDM symbols in the DL period is greater than the number of OFDM symbols in the UL period.

UL centric slot: An UL centric slot consists of a DL period, a GP (or flexible symbol), and an UL period, and the number of OFDM symbols in the DL period is less than the number of OFDM symbols in the UL period.

UL only slot or full UL slot: An UL only slot consists of only UL periods, and only UL transmission is supported.

Although only slot formats have been classified above, mini-slots can also be classified in the same classification method. That is, it can be divided into a mini-slot dedicated to downlink, a mini-slot focused on downlink, a mini-slot focused on uplink, and a mini-slot dedicated to uplink. In the above, the flexible symbol may be used as a guard symbol for transmission/reception switching, and may also be used for channel estimation.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a upper layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
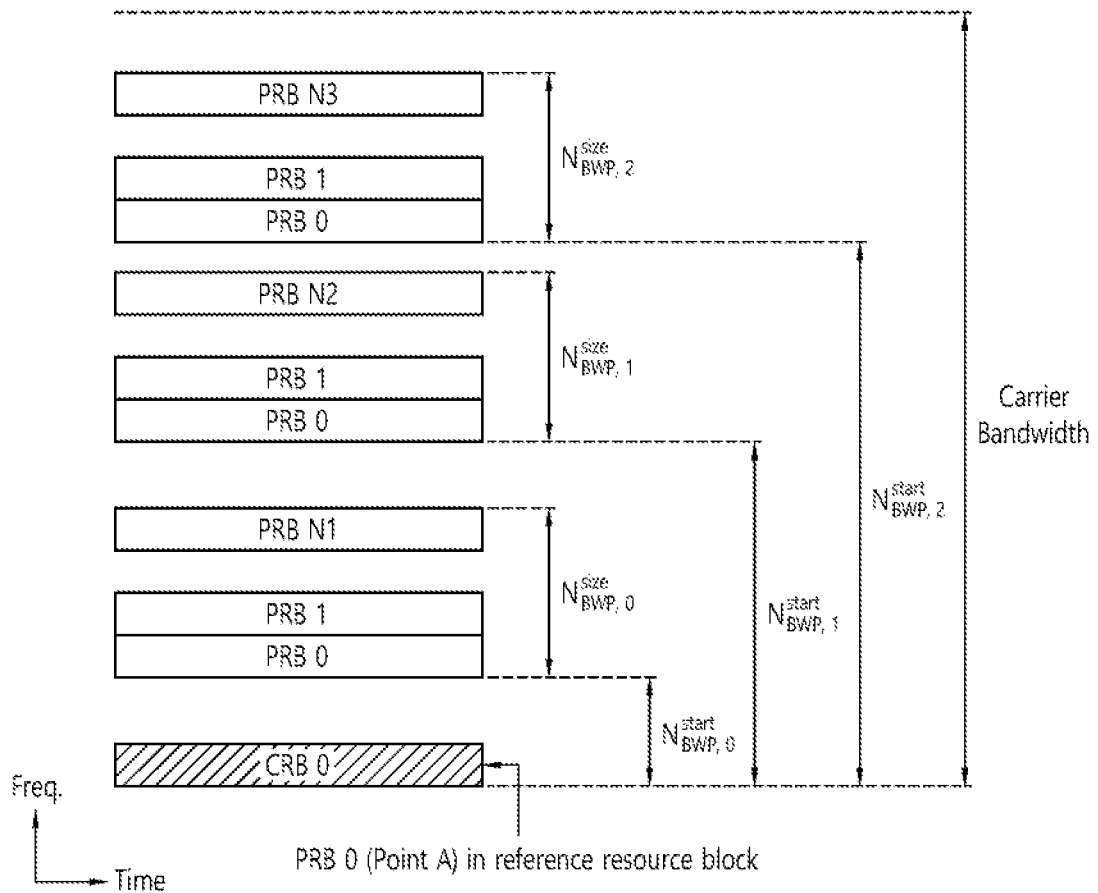
FIG. 6 shows an example of a BWP, in accordance with an embodiment of the present disclosure.

FIG. 6 shows an example of a BWP, in accordance with an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Meanwhile, in NR SL system, a plurality of numerologies having different SCS and/or CP lengths may be supported. In this case, as the SCS increases, the length of time resources through which a transmitting UE transmits an S-SSB may be shortened. Accordingly, coverage of an S-SSB may decrease. Therefore, in order to guarantee coverage of an S-SSB, a transmitting UE may transmit one or more S-SSBs to a receiving UE within one S-SSB transmission period according to SCS. For example, the number of S-SSBs that a transmitting UE transmits to a receiving UE within one S-SSB transmission period may be pre-configured or configured to a transmitting UE. For example, The S-SSB transmission period may be 160 ms. For example, for all SCSs, an S-SSB transmission period of 160 ms may be supported.

For example, when SCS is 15 kHz in FR1, a transmitting UE may transmit one or two S-SSBs to a receiving UE within one S-SSB transmission period. For example, when SCS is 30 kHz in FR1, a transmitting UE may transmit one or two S-SSBs to a receiving UE within one S-SSB transmission period. For example, when SCS is 60 kHz in FR1, a transmitting UE may transmit one, two or four S-SSBs to a receiving UE within one S-SSB transmission period.

For example, when SCS is 60 kHz in FR2, a transmitting UE may transmit 1, 2, 4, 8, 16 or 32 S-SSBs to a receiving UE within one S-SSB transmission period. For example, when SCS is 120 kHz in FR2, a transmitting UE may transmit 1, 2, 4, 8, 16, 32 or 64 S-SSBs to a receiving UE within one S-SSB transmission period.

Meanwhile, when SCS is 60 kHz, two types of CPs may be supported. In addition, the structure of an S-SSB transmitted from a transmitting UE to a receiving UE may be different according to the CP type. For example, a CP type may be Normal CP (NCP) or Extended CP (ECP). Specifically, for example, when a CP type is NCP, the number of symbols mapping a PSBCH in an S-SSB transmitted by a transmitting UE may be 9 or 8. On the other hand, for example, when a CP type is ECP, the number of symbols mapping a PSBCH in an S-SSB transmitted by a transmitting UE may be 7 or 6. For example, a PSBCH may be mapped to a first symbol in an S-SSB transmitted by a transmitting UE. For example, a receiving UE receiving an S-SSB may perform an automatic gain control (AGC) operation in the first symbol period of the S-SSB.

Figure 7:
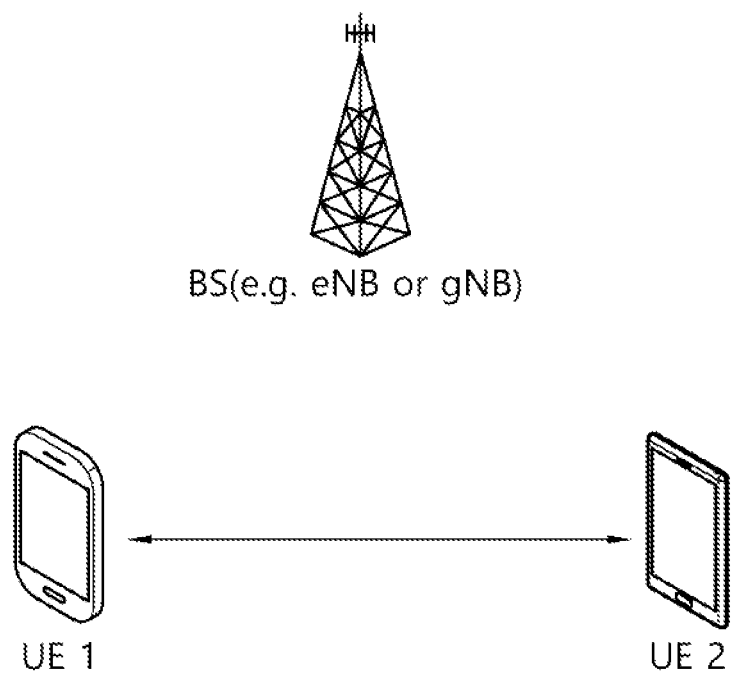
FIG. 7 shows a UE performing V2X or SL communication, in accordance with an embodiment of the present disclosure.

FIG. 7 shows a UE performing V2X or SL communication, in accordance with an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first device 100, and a UE 2 may be a second device 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
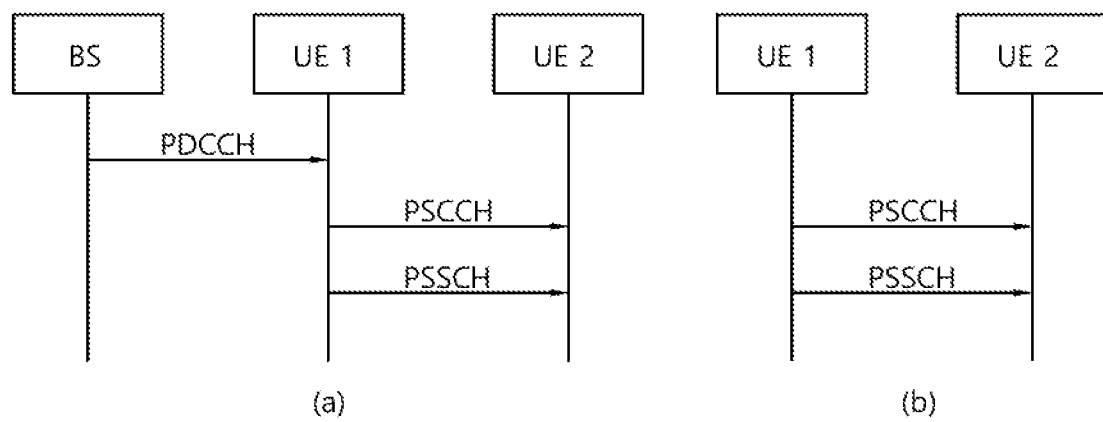
FIG. 8 shows a procedure of performing V2X or SL communication by a UE based on a transmission mode, in accordance with an embodiment of the present disclosure.

FIG. 8 shows a procedure of performing V2X or SL communication by a UE based on a transmission mode, in accordance with an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
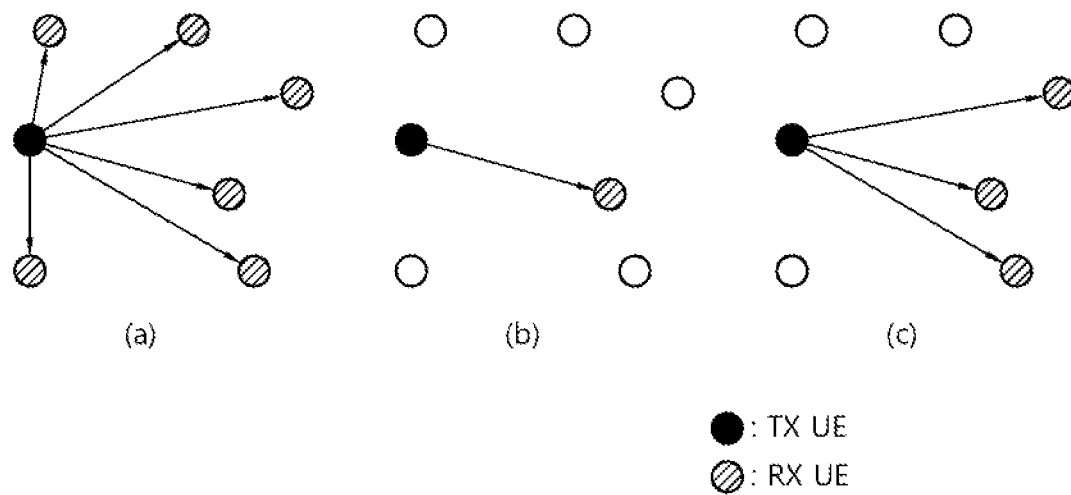
FIG. 9 shows three cast types, in accordance with an embodiment of the present disclosure.

FIG. 9 shows three cast types, in accordance with an embodiment of the present disclosure. The embodiment of FIG. 9 may be combined with various embodiments of the present disclosure. Specifically, FIG. 9(a) shows broadcast-type SL communication, FIG. 9(b) shows unicast type-SL communication, and FIG. 9(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in various embodiments of the present disclosure, for example, a TX UE may be a UE which transmits data to (target) RX UE. For example, the TX UE may be a UE which performs PSCCH transmission and/or PSSCH transmission. And/or, for example, the TX UE may be a UE which transmits SL CSI-RS(s) and/or a SL CSI report request indication to (target) RX UE(s). And/or, for example, the TX UE may be a UE which transmits a (control) channel (e.g., PSCCH, PSSCH, etc.) and/or reference signal(s) (e.g., DM-RS(s), CSI-RS(s), etc.) through the (control) channel, which is/are used for SL radio link monitoring (RLM) operation(s) and/or SL radio link failure (RLF) operation(s) of (target) RX UE(s).

Meanwhile, in various embodiments of the present disclosure, for example, an RX UE may be a UE which transmits SL HARQ feedback to a TX UE, based on whether or not data transmitted by TX UE(s) is decoded successfully and/or whether or not a PSCCH (related to PSSCH scheduling) transmitted by TX UE(s) is detected/decoded successfully. And/or, for example, the RX UE may be a UE which performs SL CSI transmission to TX UE(s) based on SL CSI-RS(s) and/or a SL CSI report request indication received from TX UE(s). And/or, for example, the RX UE may be a UE which transmits, to TX UE(s), an SL (L1(layer 1)) reference signal received power (RSRP) measurement value measured based on (pre-defined) reference signal(s) and/or SL (L1) RSRP report request indication received from TX UE(s). And/or, for example, the RX UE may be a UE which transmits its own data to TX UE(s). And/or, for example, the RX UE may be a UE which performs SL RLM and/or SL RLF operation(s) based on a (pre-configured) (control) channel and/or reference signal(s) through the (control) channel received from TX UE(s).

Meanwhile, in various embodiments of the present disclosure, for example, when an RX UE transmits SL HARQ feedback information for a PSSCH and/or PSCCH received from a TX UE, the following methods or some of the following methods may be considered. Here, for example, the following methods below or some of the following methods may be limitedly applied only when an RX UE successfully decodes/detects a PSCCH scheduling a PSSCH.

(1) Groupcast option 1: Only when an RX UE fails to decode/receive a PSSCH received from a TX UE, no acknowledgment (NACK) information may be transmitted to a TX UE.

(2) Groupcast option 2: When an RX UE succeeds in decoding/receiving a PSSCH received from a TX UE, it transmits ACK information to the TX UE, and if a PSSCH decoding/reception fails, NACK information may be transmitted to a TX UE.

Meanwhile, in various embodiments of the present disclosure, for example, a TX UE may transmit the entirety or part of information described below to RX UE(s) through SCI(s). Herein, for example, the TX UE may transmit the entirety or part of the information described below to the RX UE(s) through a first SCI and/or a second SCI.

PSSCH (and/or PSCCH) related resource allocation information (e.g., the number/positions of time/frequency resources, resource reservation information (e.g., period))
SL CSI report request indicator or SL (L1) RSRP (and/or SL (L1) RSRQ and/or SL (L1) RSSI) report request indicator
SL CSI transmission indicator (or SL (L1) RSRP (and/or SL (L1) RSRQ and/or SL (L1) RSSI) information transmission indicator)) (on a PSSCH)
Modulation and coding scheme (MCS) information
Transmit power information
L1 destination ID information and/or L1 source ID information
SL HARQ process ID information
New data indicator (NDI) information
Redundancy version (RV) information
(Transmission traffic/packet related) QoS information (e.g., priority information)
SL CSI-RS transmission indicator or information on the number of (to-be-transmitted) SL CSI-RS antenna ports
Location information of the TX UE or location (or distance region) information of target RX UE(s) (for which SL HARQ feedback is requested)
Reference signal (e.g., DM-RS, etc.) information related to channel estimation and/or decoding of data to be transmitted through a PSSCH. For example, the reference signal information may be information related to a pattern of a (time-frequency) mapping resource of DM-RS, rank information, antenna port index information, information on the number of antenna ports, etc.

Meanwhile, in various embodiments of the present disclosure, for example, since a TX UE can transmit, to an RX UE, SCI, FIRST SCI and/or SECOND SCI through a PSCCH, a PSCCH may be replaced/substituted with at least one of a SCI, a first SCI ($1^{st}$-stage SCI), and/or a second SCI ($2^{nd}$-stage SCI), or vice versa. And/or, for example, a SCI may be replaced/substituted with at least one of a PSCCH, a first SCI, and/or a second SCI, or vice versa. And/or, for example, a PSSCH may be mutually replaced/substituted with a second SCI and/or a PSCCH.

Meanwhile, in various embodiments of the present disclosure, for example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. Also, for example, the transmitting UE may transmit the first SCI to the receiving UE through the PSCCH. Also, for example, the second SCI may be transmitted to the receiving UE through an (independent) PSSCH, or may be transmitted in a piggyback manner together with data through the PSSCH.

Meanwhile, in the present disclosure, for example, "configuration" or "definition" may mean (resource pool specifically) (pre-)configuration from base station(s) or network(s) (through predefined signaling (e.g., SIB, MAC, RRC, etc.)).

Meanwhile, in various embodiments of the present disclosure, for example, RLF may be mutually replaced/substituted with out-of-synch (OOS) and/or in-synch (IS), since RLF may be determined based on an OUT-OF-SYNCH (OOS) indicator or an IN-SYNCH (IS) indicator.

Meanwhile, in the present disclosure, for example, a resource block (RB) may be mutually replaced/substituted with a subcarrier. Also, for example, a packet or a traffic may be mutually replaced/substituted with a transport block (TB) or a medium access control protocol data unit (MAC PDU) according to a transmission layer.

Meanwhile, in the present disclosure, a code block group (CBG) may be mutually replaced/substituted with a TB.

Meanwhile, in the present disclosure, for example, a source ID may be mutually replaced/substituted with a destination ID.

Meanwhile, in the present disclosure, for example, an L1 ID may be mutually replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, operation(s) of a TX UE to reserve/select/determine retransmission resource(s) may include operation(s) of the TX UE to reserve/select/determine potential retransmission resource(s) in which actual use is to be determined based on SL HARQ feedback information received from RX UE(s).

Meanwhile, in the present disclosure, a sub-selection window may be mutually replaced/substituted with a selection window and/or a pre-configured number of resource sets within the selection window.

Meanwhile, in the present disclosure, SL MODE 1 may refer to a resource allocation method or a communication method in which a base station directly schedules SL transmission resource(s) for a TX UE through pre-defined signaling (e.g., DCI). Also, for example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. Also, for example, cast may be mutually replaced/substituted with at least one of unicast, groupcast, and/or broadcast. For example, a cast type may be mutually replaced/substituted with at least one of unicast, groupcast, and/or broadcast.

Meanwhile, in the present disclosure, a resource may be mutually replaced/substituted with a slot or a symbol, or vice versa. For example, the resource may include a slot and/or a symbol.

Meanwhile, in the present disclosure, a priority may be mutually replaced/substituted with at least one of logical channel prioritization (LCP), latency, reliability, minimum required communication range, prose per-packet priority (PPPP), sidelink radio bearer (SLRB), a QoS profile/parameter, and/or requirement.

Meanwhile, in the present disclosure, a reserved resource and/or a selected resource may be mutually replaced/substituted with a sidelink grant (SL GRANT).

Meanwhile, in the present disclosure, latency may be mutually replaced/substituted with a packet delay budget (PDB).

Meanwhile, in the present disclosure, a message for triggering reporting on sidelink channel state information/sidelink channel quality information (hereinafter, SL_CSI information) may be mutually replaced/substituted with a sidelink channel state information reference signal (CSI-RS) reception.

Meanwhile, in the present disclosure, a blind retransmission may mean that a TX UE performs retransmission without receiving SL HARQ feedback information from an RX UE. For example, a retransmission based on SL HARQ feedback may mean that a TX UE determines whether to perform retransmission based on SL HARQ feedback information received from an RX UE. For example, when a TX UE receives NACK and/or DTX information from an RX UE, the TX UE may perform retransmission to the RX UE.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, LTE standard supports two types of duplexes, such as frequency division duplex (FDD) and time division duplex (TDD). In FDD, uplink and downlink have different frequency bands, and in TDD, uplink and downlink use the same frequency band. Therefore, in TDD, a frequency band must be alternately used in uplink during a specific subframe and downlink during another subframe. A UE must know exactly which subframes are used for each phase and downlink, and a base station provides such subframe information to a UE in advance. Subframe information used for uplink and downlink is referred to as TDD configuration, and a base station may provide one of a plurality of TDD configurations to a UE.

According to the TDD configuration, each subframe is divided into an uplink subframe, a downlink subframe, and a special subframe. A downlink subframe denoted by 'D' is used to transmit downlink data, and an uplink subframe denoted by 'U' is allocated to transmit uplink data. A special subframe denoted by 'S' corresponds to a subframe between a downlink subframe and an uplink subframe. As such, the reason why a special subframe is provided is that the timing at which each UE completely receives a downlink subframe and the timing at which each UE transmits uplink data are different depending on the location of the UE. For example, a UE far from a base station receives data from the base station later. Conversely, in order for a base station to receive data from a UE within a specific time, the UE must start data transmission at an earlier time. Conversely, there is no need for a special subframe between an uplink subframe and a downlink subframe.

For example, a special subframe is divided into three periods indicated by Downlink Pilot TimeSlot (DwPTS), Guard Period (GP), and Uplink pilot Timeslot (UpPTS). DwPTS is a time period for downlink reception, and UpPTS is a time period for uplink transmission. The GP is a period in which no transmission or reception is performed. Optimum values of DwPTS and UpPTS may vary depending on the propagation environment. Therefore, a base station informs a UE of appropriate DwPTS and UpPTS values in advance, and TDD configuration and DwPTS and UpPTS values may be included in TDD configuration information (IE Tdd-Config) of system information block type 1 (SystemInformationBlockType1, SIB1) broadcast from a base station and transmitted to a UE.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 10:
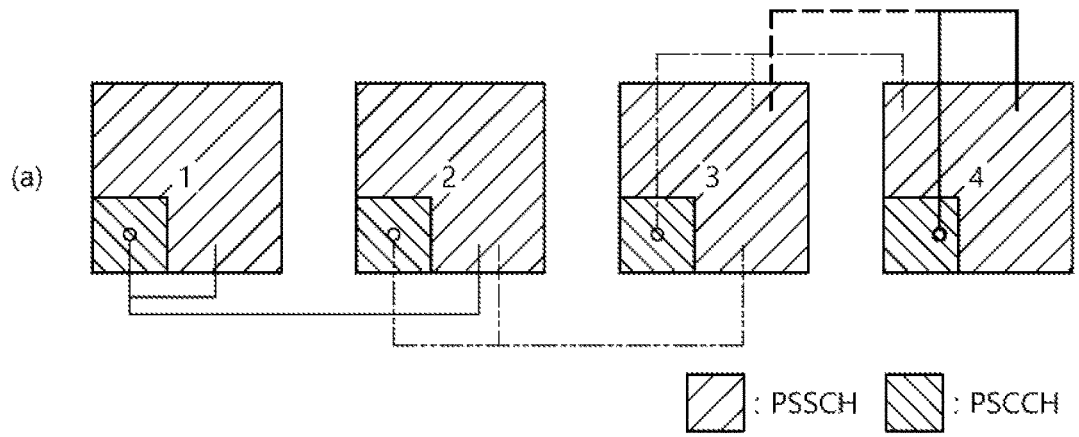
FIG. 10 shows a method in which a UE that has reserved a transmission resource informs another UE of the transmission resource, based on an embodiment of the present disclosure.
Figure 10:
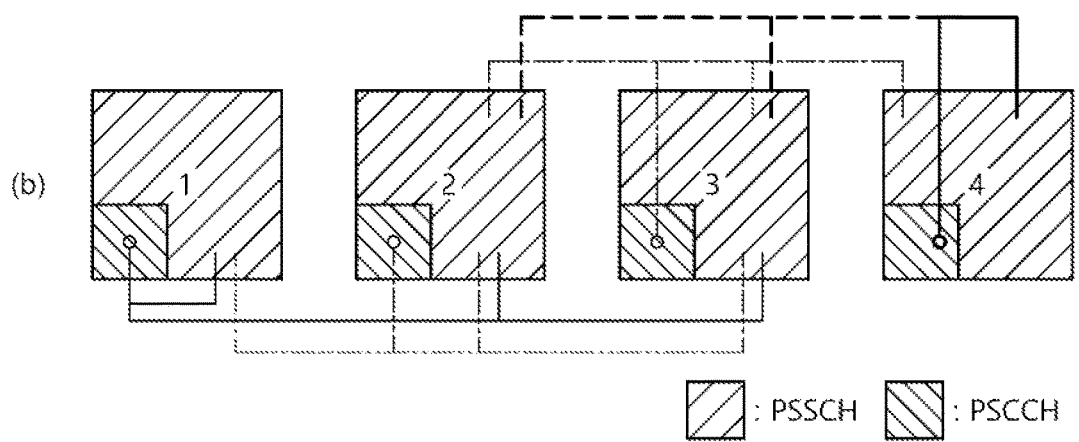
Figure 10:
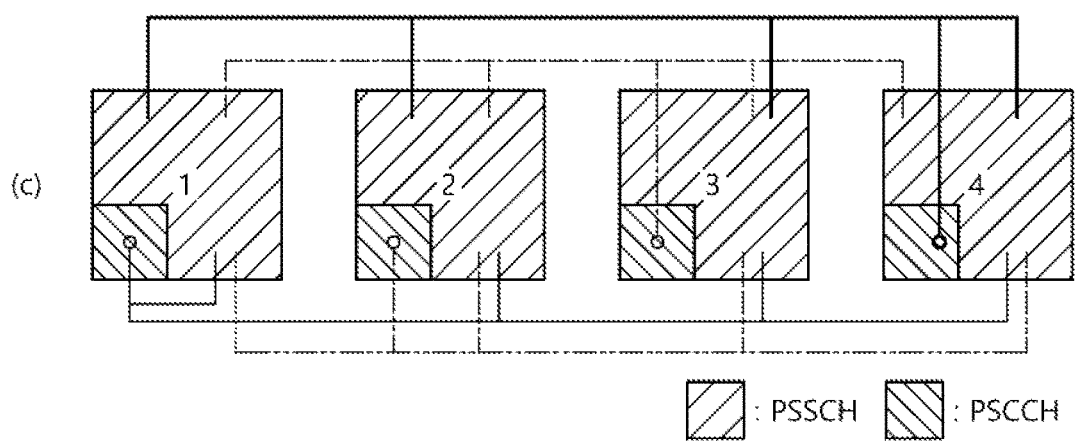

FIG. 10 shows a method in which a UE that has reserved a transmission resource informs another UE of the transmission resource, based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCI, in the case of a value of K=4. For example, (b) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may configure or designate a field/bit of location information of unused or remaining transmission resource(s) to a pre-configured value (e.g., 0). For example, in (a) and (b) of FIG. 10, if the transmitting UE may transmit/signal to the receiving UE(s) only location information of the fourth transmission-related resource through the fourth (or last) transmission-related PSCCH, the transmitting UE may be configured or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

Meanwhile, according to an embodiment of the present disclosure, in order to configure an NR SL operation on an LTE TDD carrier, an LTE TDD UL-DL configuration must be expressed/designated to an NR UE as an NR TDD UL-DL configuration. In this case, for example, various embodiments of the present disclosure may be applied to an NR UE. For example, to configure an NR SL operation on an LTE TDD carrier, an NR UE may represent/determine an LTE TDD UL-DL configuration as an NR TDD UL-DL configuration. Here, for example, the NR UE may be a UE performing NR sidelink communication.

For example, if a numerology (e.g., sub-carrier spacing, CP length) related to LTE TDD is different from a numerology related to NR TDD, the symbol/slot/subframe boundary may not match between LTE TDD and NR TDD. For example, when a numerology (e.g., sub-carrier spacing, CP length) related to an LTE TDD UL-DL configuration is different from a numerology related to an NR TDD UL-DL configuration, the symbol/slot/subframe boundary may not match between the LTE TDD UL-DL configuration and the NR TDD UL-DL configuration. Here, for example, in the case of an LTE symbol/slot/subframe partially overlapping with NR, a UE may regard it as a purpose/configuration according to an NR TDD UL-DL configuration. For example, in the case of a symbol/slot/subframe of an LTE TDD UL-DL configuration partially overlapping with a symbol/slot/subframe of an NR TDD UL-DL configuration, a UE may determine the symbol/slot/subframe of the overlapping LTE TDD UL-DL configuration as the purpose/configuration according to the NR TDD UL-DL configuration. Or, for example, in the case of an LTE symbol/slot/subframe partially overlapping with NR, a UE may regard it as a purpose/configuration according to an LTE TDD UL-DL configuration. For example, in the case of a symbol/slot/subframe of an LTE TDD UL-DL configuration that partially overlaps the symbol/slot/subframe of an NR TDD UL-DL configuration, a UE may determine the symbol/slot/subframe of the overlapping LTE TDD UL-DL configuration as the purpose/configuration according to the LTE TDD UL-DL configuration.

For example, a symbol between Uppts symbol and Dwpts symbol according to an LTE TDD UL-DL configuration may be regarded as a resource to which an NR SL operation is not applied. or example, a symbol between Uppts symbol and Dwpts symbol according to an LTE TDD UL-DL configuration may be interpreted as an NR flexible symbol. For example, a UE may determine a symbol between a Uppts symbol and a Dwpts symbol based on an LTE TDD UL-DL configuration as a resource to which an NR SL operation is not applied. For example, a UE may determine a symbol between a Uppts symbol and a Dwpts symbol based on an LTE TDD UL-DL configuration as an NR flexible symbol. Alternatively, for example, a symbol between Uppts symbol and Dwpts symbol according to an LTE TDD UL-DL configuration may be regarded as a resource to which an NR SL operation is applied. For example, a UE may determine a symbol between a Uppts symbol and a Dwpts symbol based on an LTE TDD UL-DL configuration as a resource to which an NR SL operation is applied. Or, for example, when an NR UE does not perform Uu communication with a base station (e.g., eNB) on an LTE TDD carrier, a symbol between Uppts symbol and Dwpts symbol may be regarded as a resource to which an NR SL operation is applied. For example, when an NR UE performing an NR SL operation on an LTE TDD carrier does not actually perform LTE TDD Uu communication with a base station (e.g., eNB) on an LTE TDD carrier, a symbol between a Uppts symbol and a Dwpts symbol may be regarded as a resource to which an NR SL operation is applied. For example, when an NR UE performing an NR SL operation on an LTE TDD carrier does not actually perform LTE TDD Uu communication with a base station (e.g., eNB) on an LTE TDD carrier, the NR UE may determine a symbol between a Uppts symbol and a Dwpts symbol as a resource to which an NR SL operation is applied.

For example, although a numerology (e.g., sub-carrier spacing, CP length) related to LTE TDD is different from a numerology related to NR TDD, an NR UE may not deactivate an NR SL operation on an LTE TDD carrier. Or, for example, even though a numerology (e.g., sub-carrier spacing, CP length) related to LTE TDD is different from a numerology related to NR TDD, an NR UE may not deactivate an NR SL BWP on an LTE TDD carrier. For example, although a numerology related to LTE TDD is different from a numerology related to NR TDD, an NR SL operation on an LTE TDD carrier may not be configured to be deactivated for an NR UE. Or, for example, although a numerology (e.g., sub-carrier spacing, CP length) related to LTE TDD is different from a numerology related to NR TDD, NR SL BWP on an LTE TDD carrier may not be configured to be deactivated for an NR UE. Here, for example, the above-described embodiment may be applied when an NR UE does not perform Uu communication with a base station (e.g., eNB) on an LTE TDD carrier. For example, the above-described embodiment may be applied to the case where an NR UE performing an NR SL operation on an LTE TDD carrier does not actually perform LTE TDD Uu communication with a base station (e.g., eNB) on the LTE TDD carrier. Or, for example, if a numerology (e.g., sub-carrier spacing, CP length) related to LTE TDD is different from a numerology related to NR TDD, an NR UE may deactivate an NR SL operation on an LTE TDD carrier. Or, for example, if a numerology (e.g., sub-carrier spacing, CP length) related to LTE TDD is different from a numerology related to NR TDD, an NR UE may deactivate an NR SL BWP on an LTE TDD carrier. For example, when a numerology related to LTE TDD is different from a numerology related to NR TDD, an NR SL operation on an LTE TDD carrier may be configured to be deactivated for an NR UE. Or, for example, if a numerology (e.g., sub-carrier spacing, CP length) related to LTE TDD is different from a numerology related to NR TDD, an NR SL BWP on an LTE TDD carrier may be configured to be deactivated for an NR UE.

For example, in order to express/designate an LTE TDD UL-DL configuration by using the existing NR TDD UL-DL configuration, a U/D pattern related to the LTE TDD UL-DL configuration may be circularly shifted. For example, in order for a UE to express/designate an LTE TDD UL-DL configuration by maximizing the existing NR TDD UL-DL configuration, the UE may circularly shift a U/D pattern related to an LTE TDD UL-DL configuration. For example, in case of LTE TDD UL-DL CONFIGURATION #5, a U/D pattern may be DSUDDDDDDD. At this time, for example, after DSUDDDDDDD is circularly shifted to DDDDDDDDSU, an LTE TDD UL-DL configuration can be expressed/designated by using an NR TDD UL-DL configuration. For example, after DSUDDDDDDD circularly shifts to DDDDDDDDSU, a UE may use the existing NR TDD UL-DL configuration. For example, after DSUDDDDDDD circularly shifts to DDDDDDDDSU, a UE may determine an LTE TDD UL-DL configuration as an NR TDD UL-DL CONFIGURATION. Or, for example, in the case of an LTE TDD carrier configured with an LTE TDD UL-DL configuration that cannot be expressed/designated as an NR TDD UL-DL configuration, an NR UE may not expect that the NR SL operation is configured. For example, in the case of an LTE TDD carrier configured with an LTE TDD UL-DL configuration that cannot be expressed/designated as an existing NR TDD UL-DL configuration, an NR UE may not perform an NR SL operation.

According to an embodiment of the present disclosure, in the case of a UE located outside coverage of a base station (hereinafter referred to as an out-of-coverage UE), the out-of-coverage UE may always expect a reference SCS value related to an TDD UL-DL configuration to be the same as an SL SCS value. For example, a reference SCS value related to an TDD UL-DL configuration may be pre-configured. For example, an TDD UL-DL configuration may be pre-configured. For example, SL SCS may be configured as a parameter related to SL BWP. For example, an out-of-coverage UE may exceptionally determine that a reference SCS value related to an TDD UL-DL configuration has the same SL SCS value, unlike a UE located within coverage of a base station.

According to an embodiment of the present disclosure, when additional reserved/selected resources are not needed/existent after SCI transmission time (e.g., slot N) (e.g., PSCCH/PSSCH transmission on slot N is last transmission), a "TIME-DOMAIN RESOURCE INDICATOR" field value (e.g., N bit) on SCI may be designated as a pre-configured value (e.g., 0 or 2N−1). For example, the case in which additional reservation/selection resources are not required/existent after the point at which SCI is transmitted (e.g., slot N) may include a case in which PSCCH/PSSCH transmission in slot N is the last transmission before resource reselection is performed, a case where PSCCH/PSSCH transmission in slot N is the last transmission before resource reselection related to a specific TB is performed, or a case where PSCCH/PSSCH transmission in slot N is the last transmission before new resource selection is performed.

In this case, for example, a UE may determine a "TIME-DOMAIN RESOURCE INDICATOR" field value (e.g., N bit) on SCI as a pre-configured value (e.g., 0 or 2N−1). Here, for example, a "FREQUENCY-DOMAIN RESOURCE INDICATOR" field value (e.g., M bits) on SCI may be designated by UE implementation (e.g., randomly selected bits). Alternatively, for example, a "FREQUENCY-DOMAIN RESOURCE INDICATOR" field value on SCI may be designated as a pre-configured value (e.g., 2M−1). For example, a UE may determine a value (e.g., M bits) of a "FREQUENCY-DOMAIN RESOURCE INDICATOR" field on SCI by UE implementation (e.g., randomly selecting bits). Alternatively, for example, a UE may determine a value of a "FREQUENCY-DOMAIN RESOURCE INDICATOR" field on SCI as a pre-configured value (e.g., 2M−1). Also, for example, SCI transmitted on slot N may signal time/frequency resource information for future PSCCH/PSSCH transmission and information on the number of subchannels related to PSCCH/PSSCH transmitted on slot N. For example, a UE may signal time/frequency resource information for PSCCH/PSSCH transmission after slot N in the time domain and information on the number of subchannels related to PSCCH/PSSCH transmitted on slot N through SCI transmitted on slot N. For example, the time/frequency resource information for PSCCH/PSSCH transmission may include slot position where PSCCH/PSSCH transmission is performed, offset information, subchannel start position information where PSCCH/PSSCH transmission is performed, and information on the number of subchannels used for the corresponding transmission. For example, offset information may be offset information based on slot N. For example, in addition to the case of mode 2, the embodiment of the present disclosure may be applied to the case where a base station reserves SL transmission resources and informs a UE of information regarding the reserved transmission resources through physical/higher layer signaling (e.g., DCI, RRC) (e.g., mode 1). In addition, for example, according to the number of subchannels configured specifically for a resource pool and/or the maximum number of resources that can be signaled with one SCI and/or the number of subchannels and/or resources actually used for PSSCH transmission, various embodiments of the present disclosure may be configured differently. For example, according to the number of subchannels configured specifically for a resource pool and/or the maximum number of resources that can be signaled with one SCI and/or the number of subchannels and/or resources actually used for PSSCH transmission, whether or not to apply various embodiments of the present disclosure may be configured differently. For example, when the maximum number of resources that can be signaled through one SCI is 1, an embodiment of the present disclosure may not be applied.

Additionally, for example, in Rel-16 NR sidelink, LTE Uu controlling NR SL may be supported. In this case, for example, NR sidelink can be operated on an LTE TDD carrier. For example, in an LTE TDD system, there may be 7 TDD patterns with a period of 10 ms. For example, since IE TDD-UL-DL-ConfigCommon can indicate up to two DL-to-UL switching, some modification may be required to express the LTE TDD pattern. Specifically, for example, the LTE TDD pattern may allow both DL-to-UL switching and UL-to-DL switching within a pattern period (5 ms or 10 ms). On the other hand, for example, the NR TDD patterns allow DL-to-UL switching only once within a pattern period, and can support up to two patterns. For example, if the TDD pattern indication starts in the first subframe of SFN 0, it may be necessary to support three patterns to represent all LTE TDD patterns. For example, LTE TDD UL-DL configuration #6 ("DSUUUDSUUD") may be divided into three patterns: "DSUUU", "DSUU", and "D". Or, for example, it may be considered that the TDD pattern indication may start in another subframe of SFN 0 by applying a specific slot offset. For example, LTE TDD UL-DL configuration #6 ("DSUUUDSUUD") can be expressed as two patterns such as "DDSUUU" and "DSUU", the first slot of these two patterns may be the 10th subframe of the frame. Meanwhile, for example, other LTE TDD patterns may be expressed with slight modifications by IE TDD-UL-DL-ConfigCommon. For example, LTE TDD UL-DL configuration #1 ("DSUUDDSUUD") may be expressed in two patterns of "DSUU" and "D". For example, LTE TDD UL-DL configuration #5 ("DSUDDDDDDD") may be expressed in two patterns of "DSU" and "DDDDDDD". In this case, for example, it may be necessary to additionally support a periodicity of 7 ms. That is, for example, IE TDD-UL-DL-ConfigCommon may indicate LTE UL-DL configurations #0, 1, 2, and 3 without modification. For example, IE TDD-UL-DL-ConfigCommon may indicate LTE UL-DL configurations #4 and 5 by adding more support periods (e.g., 6 ms, 7 ms). For example, many modifications to IE TDD-UL-DL-ConfigCommon may be required to express LTE UL-DL configuration #6. For example, if an LTE UL-DL configuration is #0, #1, #2 or #3, Rel-16 NR sidelink may support NR sidelink operation in LTE TDD carrier.

Figure 11:
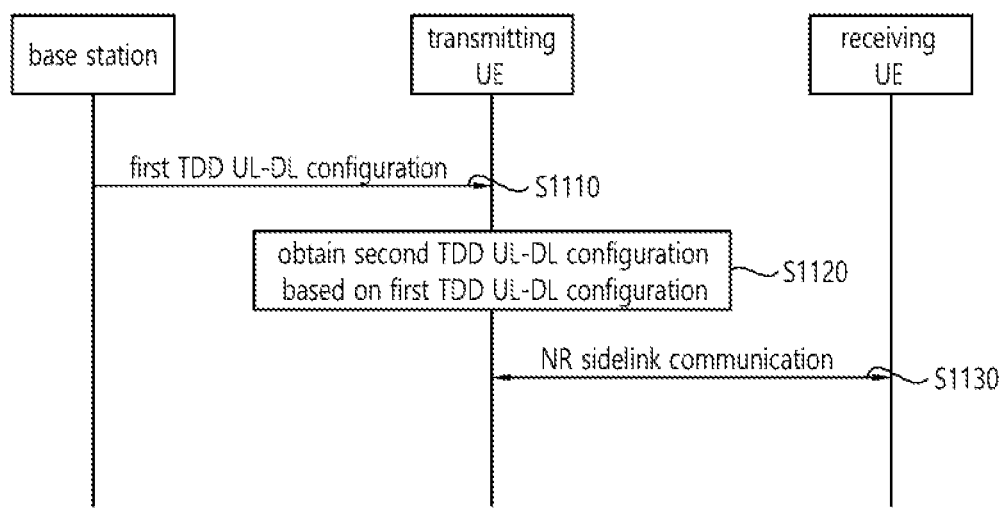
FIG. 11 shows a procedure in which a transmitting UE performs NR sidelink communication with a receiving UE on a carrier related to LTE, according to an embodiment of the present disclosure.
Figure 12:
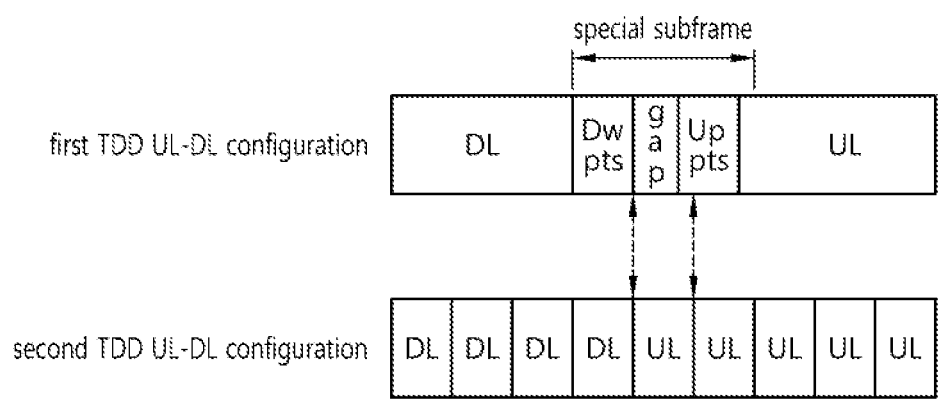
FIG. 12 shows an example in which a symbol in a special subframe of a first TDD UL-DL configuration and a symbol in a second TDD UL-DL overlap according to an embodiment of the present disclosure.
Figure 13:
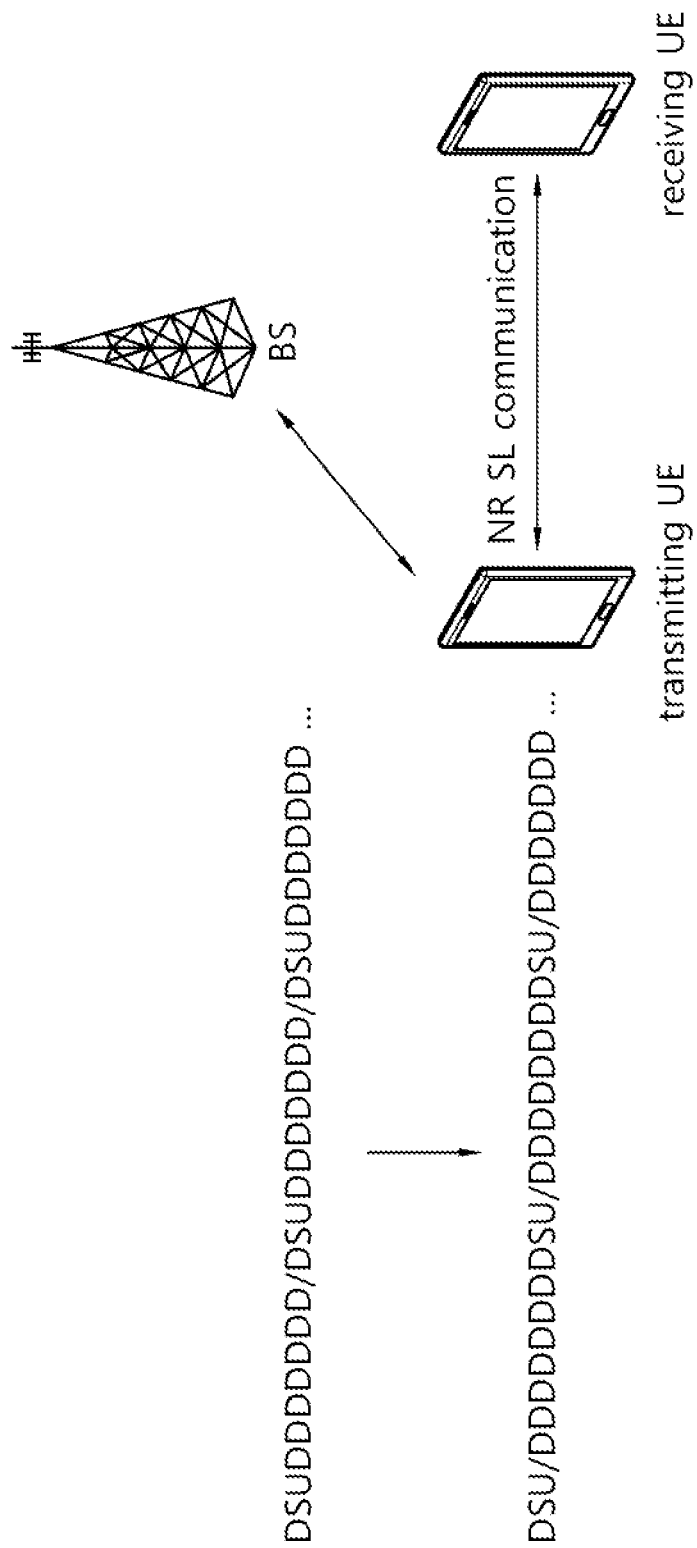
FIG. 13 shows an example of circularly shifting a first TDD UL-DL configuration. The embodiments of FIGS. 11 to 13 may be combined with various embodiments of the present disclosure.

FIG. 11 shows a procedure in which a transmitting UE performs NR sidelink communication with a receiving UE on a carrier related to LTE, according to an embodiment of the present disclosure. FIG. 12 shows an example in which a symbol in a special subframe of a first TDD UL-DL configuration and a symbol in a second TDD UL-DL overlap according to an embodiment of the present disclosure. FIG. 13 shows an example of circularly shifting a first TDD UL-DL configuration. The embodiments of FIGS. 11 to 13 may be combined with various embodiments of the present disclosure.

Referring to FIG. 11, in step S1110, a transmitting UE may receive a first TDD UL-DL configuration related to LTE. For example, a transmitting UE may receive a first TDD UL-DL configuration from a base station or network. For example, a first TDD UL-DL configuration may include a UL subframe, a DL subframe, and a special subframe. For example, a transmitting UE may determine configurations of UL subframes, DL subframes, and special subframes based on the first TDD UL-DL configuration. For example, a special subframe may include a downlink pilot time slot (Dwpts) symbol, an uplink pilot time slot (Uppts) symbol, and a gap symbol.

In step S1120, a transmitting UE may obtain a second TDD UL-DL configuration related to NR sidelink communication based on a first TDD UL-DL configuration. For example, a transmitting UE may determine configurations of UL symbols, DL symbols, and flexible symbols in one slot based on a second TDD UL-DL configuration related to NR sidelink communication.

In step S1130, a transmitting UE may perform NR sidelink communication with a receiving UE on a carrier related to LTE based on a second TDD UL-DL configuration. For example, based on Uppts symbols and gap symbols related to a first TDD UL-DL configuration and a first symbol related to a second TDD UL-DL configuration overlapping, NR sidelink communication may be allowed for a transmitting UE in the first symbol. For example, based on Uu communication between a transmitting UE and a base station being not performed on a carrier related to LTE, NR sidelink communication may be allowed for the transmitting UE in a first symbol.

For example, a UL-DL pattern for a first TDD UL-DL configuration may be DSUDDDDDDD. Here, for example, D may be a DL subframe, S may be a special subframe, and U may be a UL subframe. For example, in FIG. 12, a UL-DL pattern for a first TDD UL-DL configuration may indicate the DSU part in DSUDDDDDDD. Referring to FIG. 12, for example, gap symbols and Uppts symbols in a special subframe related to a first TDD UL-DL configuration may overlap a UL symbol related to a second TDD UL-DL configuration. For example, based on the gap symbol and Uppts symbol in the special subframe related to the 1st TDD UL-DL configuration overlapping with the UL symbol related to the 2nd TDD UL-DL configuration, NR sidelink communication may be allowed for a transmitting UE in overlapping UL symbol. That is, for example, a transmitting UE may perform NR sidelink communication using an overlapped UL symbol.

For example, a transmitting UE may transmit a physical sidelink broadcast channel (PSBCH) to a receiving UE based on a second TDD UL-DL configuration.

For example, a numerology of a first TDD UL-DL configuration and a numerology of a second TDD UL-DL configuration may be different. For example, the numerology may include at least one of sub-carrier spacing and the length of cyclic prefix. For example, based on a numerology of a first TDD UL-DL configuration and a numerology of a second TDD UL-DL configuration being different, NR sidelink communication performed on a carrier related to LTE may not be deactivated for a transmitting UE.

For example, based on Uu communication between a transmitting UE and a base station being not performed on an LTE-related carrier, NR sidelink communication performed on a carrier related to LTE may not be deactivated for a transmitting UE.

For example, a second TDD UL-DL configuration may be obtained based on a UL/DL pattern for a first TDD UL-DL configuration being shifted. For example, a transmitting UE may obtain a second TDD UL-DL configuration based on a UL/DL pattern for a first TDD UL-DL configuration being shifted. Here, for example, the shifting may be performed based on a circular shift. For example, based on a first TDD UL-DL configuration being configured in the order of a first DL subframe, a special subframe, a UL subframe, and a plurality of second DL subframes, the first TDD UL-DL configuration may be shifted in the order of a plurality of second DL subframes, first DL subframes, special subframes, and UL subframes. For example, based on a second TDD UL-DL configuration related to NR sidelink communication cannot being obtained based on a first TDD UL-DL configuration, NR sidelink communication may not be performed.

Referring to FIG. 13, for example, a transmitting UE may receive a UL-DL pattern (e.g., DSUDDDDDDD) for a first TDD UL-DL configuration related to LTE from a base station or network. Here, for example, a transmitting UE may receive a UL-DL pattern for a first TDD UL-DL configuration in the form of "DSUDDDDDDD/ DSUDDDDDDD/DSUDDDDD . . . ". For example, a transmitting UE may shift the received "DSUDDDDDDD/ DSUDDDDDDD/DSUDDDDD . . . " to "DSU/ DDDDDDDDSU/DDDDDDDDSU/DDDDD . . . " based on a circular shift. That is, for example, a transmitting UE may obtain a TDD UL-DL configuration related to NR sidelink communication based on a TDD UL-DL configuration related to LTE by shifting so that a form that a DL subframe follows a UL subframe does not appear in a UL-DL pattern.

Additionally, for example, based on a transmitting UE being a UE outside the coverage of a base station, a reference sub-carrier spacing (SCS) value of the transmitting UE may be configured equal to an SL SCS.

Figure 14:
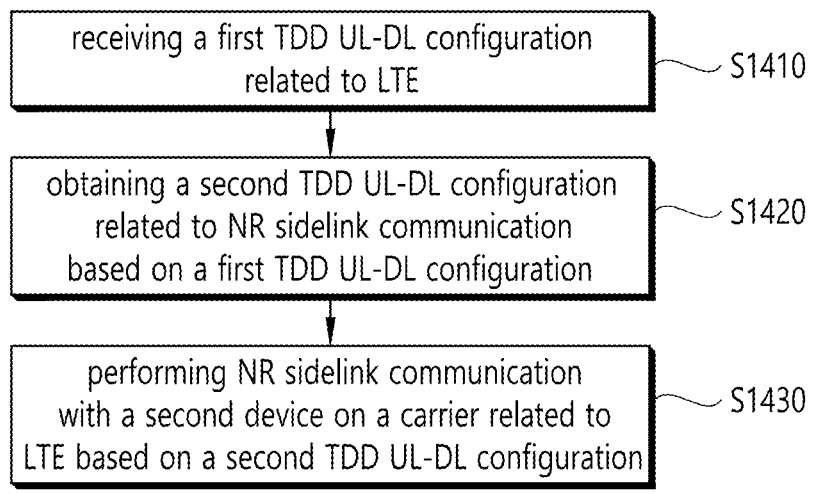
FIG. 14 shows a method in which a first device performs NR sidelink communication with a second device on an LTE-related carrier according to an embodiment of the present disclosure.

FIG. 14 shows a method in which a first device performs NR sidelink communication with a second device on an LTE-related carrier according to an embodiment of the present disclosure. The embodiment of FIG. 14 may be combined with various embodiments of the present disclosure.

Referring to FIG. 14, in step S1410, a first device 100 may receive a first time division duplex uplink-downlink configuration (TDD UL-DL configuration) related to LTE. For example, a first device 100 may receive a first TDD UL-DL configuration from a base station or network. For example, the first TDD UL-DL configuration may include a UL subframe, a DL subframe and a special subframe. For example, a first device 100 may determine configurations of a UL subframe, a DL subframe, and a special subframe based on a first TDD UL-DL configuration. For example, the special subframe may include a downlink pilot time slot (Dwpts) symbol, an uplink pilot time slot (Uppts) symbol and a gap symbol.

In step S1420, a first device 100 may obtain a second TDD UL-DL configuration related to NR sidelink communication based on the first TDD UL-DL configuration. For example, a first device 100 may determine configurations of UL symbols, DL symbols, and flexible symbols in one slot based on a second TDD UL-DL configuration related to NR sidelink communication.

In step S1430, a first device 100 may perform the NR sidelink communication with a second device 200 on a carrier related to the LTE based on the second TDD UL-DL configuration. For example, the NR sidelink communication may be allowed for the first device 100 in a first symbol, based on the Uppts symbol and the gap symbol related to the first TDD UL-DL configuration overlapping with the first symbol related to the second TDD UL-DL configuration. For example, the NR sidelink communication may be allowed for the first device 100 in the first symbol, based on Uu communication of the first device 100 with a base station on the carrier related to the LTE being not performed.

For example, a first device 100 may transmit, to the second device 200, a physical sidelink broadcast channel (PSBCH) based on the second TDD UL-DL configuration.

For example, a numerology of the first TDD UL-DL configuration and a numerology of the second TDD UL-DL configuration may be different. For example, a numerology may include at least one of sub-carrier spacing or a length of cyclic prefix. For example, the NR sidelink communication performed on the carrier related to the LTE may not be deactivated for the first device 100, based on the numerology of the first TDD UL-DL configuration and the numerology of the second TDD UL-DL configuration being different.

For example, the NR sidelink communication performed on the carrier related to the LTE is not deactivated for the first device 100, based on Uu communication of the first device 100 with a base station on the carrier related to the LTE being not performed.

For example, the second TDD UL-DL configuration may be obtained based on a UL/DL pattern for the first TDD UL-DL configuration being shifted. For example, the first device 100 may obtain the second TDD UL-DL configuration based on a UL/DL pattern for the first TDD UL-DL configuration being shifted. Here, for example, the shifting may be performed based on circular shift. For example, the first TDD UL-DL configuration may be shifted in order of a plurality of second DL subframes, a first DL subframe, the special subframe and the UL subframe, based on the first TDD UL-DL configuration being configured in order of the first DL subframe, the special subframe, the UL subframe and the plurality of second DL subframes. For example, the NR sidelink communication may not be performed, based on the second TDD UL-DL configuration related to the NR sidelink communication cannot being obtained based on the first TDD UL-DL configuration.

For example, a reference sub-carrier spacing (SCS) value of the first device 100 may be configured equal to an SL SCS, based on the first device 100 being a UE out of coverage of a base station.

The above-described embodiment may be applied to various devices described below. For example, a processor 102 of a first device 100 may control a transceiver 106 to receive a first time division duplex uplink-downlink configuration (TDD UL-DL configuration) related to LTE. And, for example, the processor 102 of the first device 100 may obtain a second TDD UL-DL configuration related to NR sidelink communication based on the first TDD UL-DL configuration. And, the processor 102 of the first device 100 may control the transceiver 106 to perform the NR sidelink communication with a second device 200 on a carrier related to the LTE based on the second TDD UL-DL configuration.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: receive a first time division duplex uplink-downlink configuration (TDD UL-DL configuration) related to LTE; obtain a second TDD UL-DL configuration related to NR sidelink communication based on the first TDD UL-DL configuration; and perform the NR sidelink communication with a second device on a carrier related to the LTE based on the second TDD UL-DL configuration. For example, the first TDD UL-DL configuration may include a UL subframe, a DL subframe and a special subframe. For example, the special subframe may include a downlink pilot time slot (Dwpts) symbol, an uplink pilot time slot (Uppts) symbol and a gap symbol. For example, the NR sidelink communication may be allowed for the first device in a first symbol, based on the Uppts symbol and the gap symbol related to the first TDD UL-DL configuration overlapping with the first symbol related to the second TDD UL-DL configuration.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: receive a first time division duplex uplink-downlink configuration (TDD UL-DL configuration) related to LTE; obtain a second TDD UL-DL configuration related to NR sidelink communication based on the first TDD UL-DL configuration; and perform the NR sidelink communication with a second UE on a carrier related to the LTE based on the second TDD UL-DL configuration. For example, the first TDD UL-DL configuration may include a UL subframe, a DL subframe and a special subframe. For example, the special subframe may include a downlink pilot time slot (Dwpts) symbol, an uplink pilot time slot (Uppts) symbol and a gap symbol. For example, the NR sidelink communication may be allowed for the first device in a first symbol, based on the Uppts symbol and the gap symbol related to the first TDD UL-DL configuration overlapping with the first symbol related to the second TDD UL-DL configuration.

According to an embodiment of the present disclosure, a non-transitory computer-readable storage medium storing instructions may be proposed. For example, the instructions, when executed, may cause a first device to: receive a first time division duplex uplink-downlink configuration (TDD UL-DL configuration) related to LTE; obtain a second TDD UL-DL configuration related to NR sidelink communication based on the first TDD UL-DL configuration; and perform the NR sidelink communication with a second device 200 on a carrier related to the LTE based on the second TDD UL-DL configuration. For example, the first TDD UL-DL configuration may include a UL subframe, a DL subframe and a special subframe. For example, the special subframe may include a downlink pilot time slot (Dwpts) symbol, an uplink pilot time slot (Uppts) symbol and a gap symbol. For example, the NR sidelink communication may be allowed for the first device in a first symbol, based on the Uppts symbol and the gap symbol related to the first TDD UL-DL configuration overlapping with the first symbol related to the second TDD UL-DL configuration.

FIG. 15 shows a method for a second device to perform NR sidelink communication with a first device on an LTE-related carrier according to an embodiment of the present disclosure. The embodiment of FIG. 15 may be combined with various embodiments of the present disclosure.

Referring to FIG. 15, in step S1510, a second device 200 may perform NR sidelink communication with a first device 100 on a carrier related to LTE.

For example, a first TDD UL-DL configuration may be received from a base station or a network. For example, the first TDD UL-DL configuration may include a UL subframe, a DL subframe and a special subframe. For example, configurations of a UL subframe, a DL subframe, and a special subframe may be determined based on the first TDD UL-DL configuration. For example, the special subframe may include a downlink pilot time slot (Dwpts) symbol, an uplink pilot time slot (Uppts) symbol and a gap symbol.

For example, a second TDD UL-DL configuration related to the NR sidelink communication may be obtained based on the first TDD UL-DL configuration. For example, configurations of UL symbols, DL symbols, and flexible symbols in one slot may be determined based on the second TDD UL-DL configuration related to NR sidelink communication.

For example, the second device 200 may perform NR sidelink communication with the first device 100 on a carrier related to LTE based on the second TDD UL-DL configuration. For example, the NR sidelink communication may be allowed for the first device 100 in a first symbol, based on the Uppts symbol and the gap symbol related to the first TDD UL-DL configuration overlapping with the first symbol related to the second TDD UL-DL configuration. For example, the NR sidelink communication may be allowed for the first device 100 in the first symbol, based on Uu communication of the first device 100 with a base station on the carrier related to the LTE being not performed.

For example, the second device 200 may receive a physical sidelink broadcast channel (PSBCH) from the first device 100 based on the second TDD UL-DL configuration.

For example, a numerology of the first TDD UL-DL configuration and a numerology of the second TDD UL-DL configuration may be different. For example, a numerology may include at least one of sub-carrier spacing or a length of cyclic prefix. For example, the NR sidelink communication performed on the carrier related to the LTE may not be deactivated for the first device 100, based on the numerology of the first TDD UL-DL configuration and the numerology of the second TDD UL-DL configuration being different.

For example, the NR sidelink communication performed on the carrier related to the LTE is not deactivated for the first device 100, based on Uu communication of the first device 100 with a base station on the carrier related to the LTE being not performed.

For example, the second TDD UL-DL configuration may be obtained based on a UL/DL pattern for the first TDD UL-DL configuration being shifted. For example, the first device 100 may obtain the second TDD UL-DL configuration based on a UL/DL pattern for the first TDD UL-DL configuration being shifted. Here, for example, the shifting may be performed based on circular shift. For example, the first TDD UL-DL configuration may be shifted in order of a plurality of second DL subframes, a first DL subframe, the special subframe and the UL subframe, based on the first TDD UL-DL configuration being configured in order of the first DL subframe, the special subframe, the UL subframe and the plurality of second DL subframes. For example, the NR sidelink communication may not be performed, based on the second TDD UL-DL configuration related to the NR sidelink communication cannot being obtained based on the first TDD UL-DL configuration.

For example, a reference sub-carrier spacing (SCS) value of the second device 200 may be configured equal to an SL SCS, based on the second device 200 being a UE out of coverage of a base station.

The above-described embodiment may be applied to various devices described below. For example, a processor 202 of a second device 200 may control a transceiver 206 to perform NR sidelink communication with a first device 100 on a carrier related to LTE.

According to an embodiment of the present disclosure, a second device for performing wireless communication may be proposed. For example, the second device 200 may comprise: one or more memories storing instructions; one or more transceivers; and one or more processors connected to the one or more memories and the one or more transceivers. For example, the one or more processors may execute the instructions to: perform NR sidelink communication with a first device on a carrier related to LTE. For example, a first time division duplex uplink-downlink configuration (TDD UL-DL configuration) related to the LTE may be received. For example, a second TDD UL-DL configuration related to the NR sidelink communication may be obtained based on the first TDD UL-DL configuration. For example, the NR sidelink communication may be performed on the carrier related to the LTE based on the second TDD UL-DL configuration. For example, the first TDD UL-DL configuration may include a UL subframe, a DL subframe and a special subframe. For example, the special subframe may include a downlink pilot time slot (Dwpts) symbol, an uplink pilot time slot (Uppts) symbol and a gap symbol. For example, the NR sidelink communication may be allowed for the first device in a first symbol, based on the Uppts symbol and the gap symbol related to the first TDD UL-DL configuration overlapping with the first symbol related to the second TDD UL-DL configuration.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
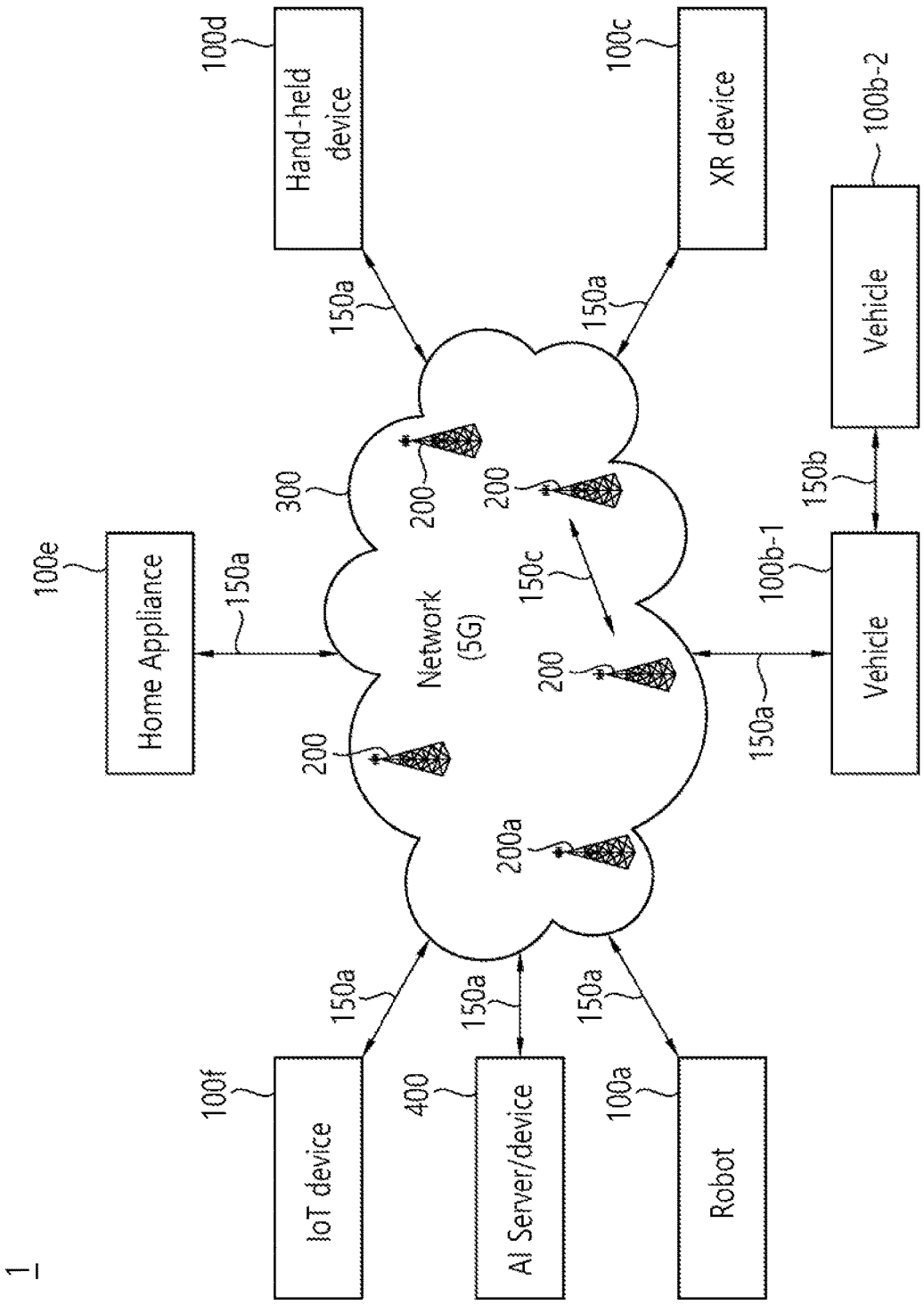
FIG. 16 shows a communication system 1, in accordance with an embodiment of the present disclosure.

FIG. 16 shows a communication system 1, in accordance with an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1)

LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
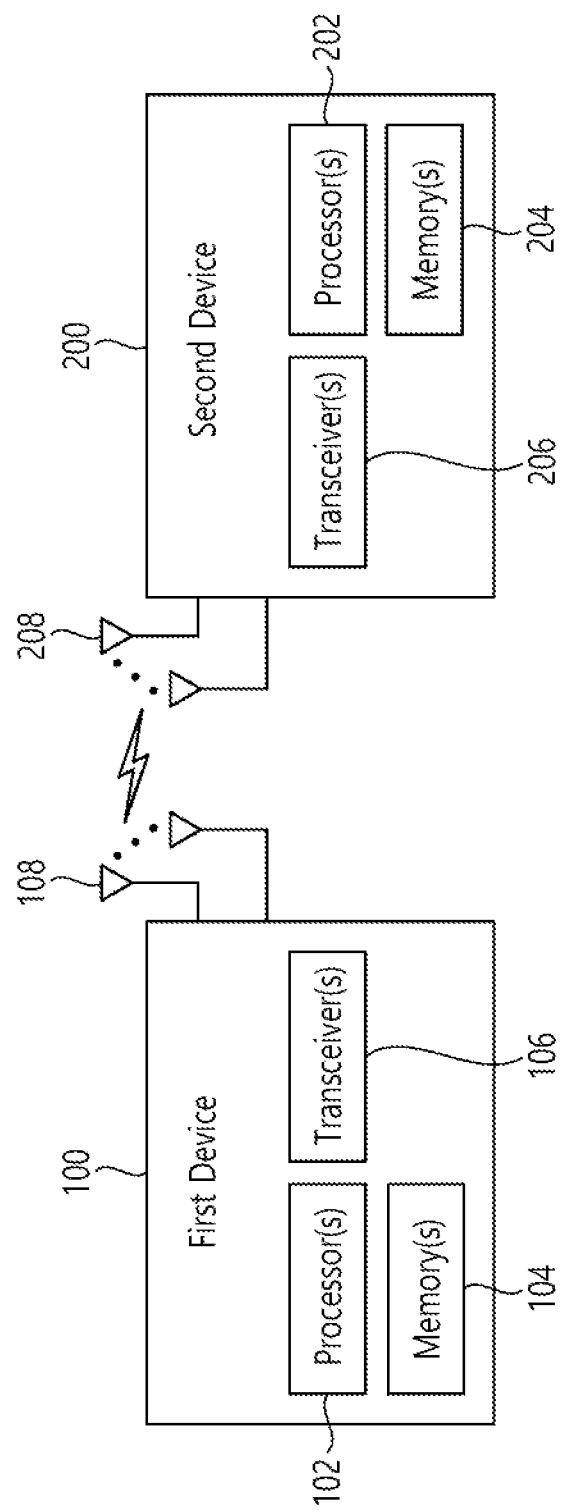
FIG. 17 shows wireless devices, in accordance with an embodiment of the present disclosure.

FIG. 17 shows wireless devices, in accordance with an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and obtain the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
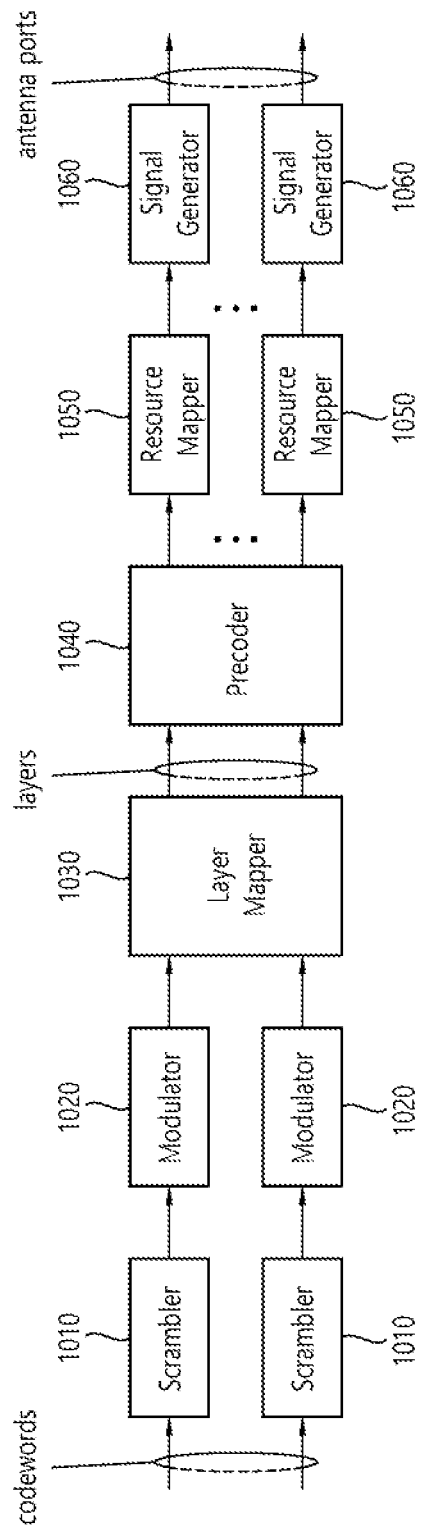
FIG. 18 shows a signal process circuit for a transmission signal, in accordance with an embodiment of the present disclosure.

FIG. 18 shows a signal process circuit for a transmission signal, in accordance with an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
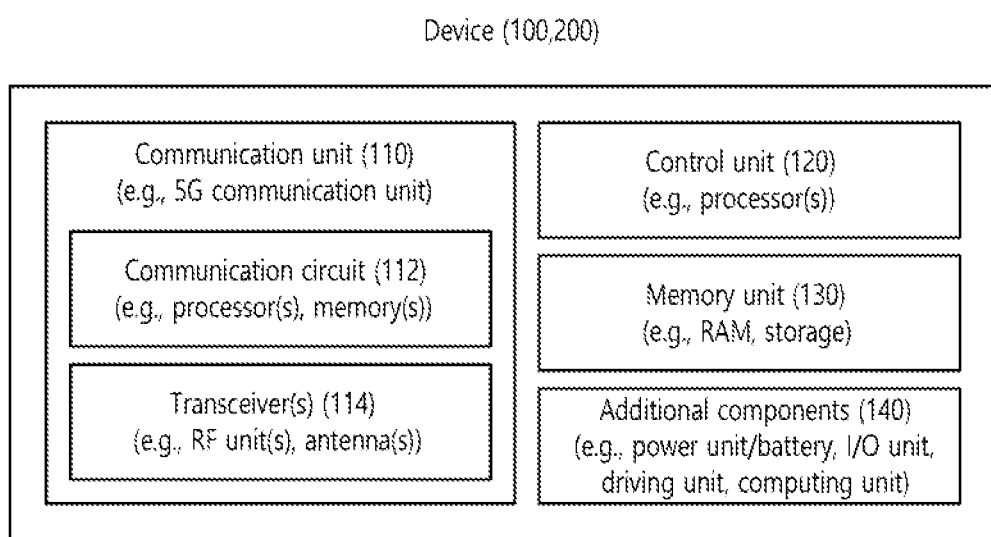
FIG. 19 shows another example of a wireless device, in accordance with an embodiment of the present disclosure.

FIG. 19 shows another example of a wireless device, in accordance with an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
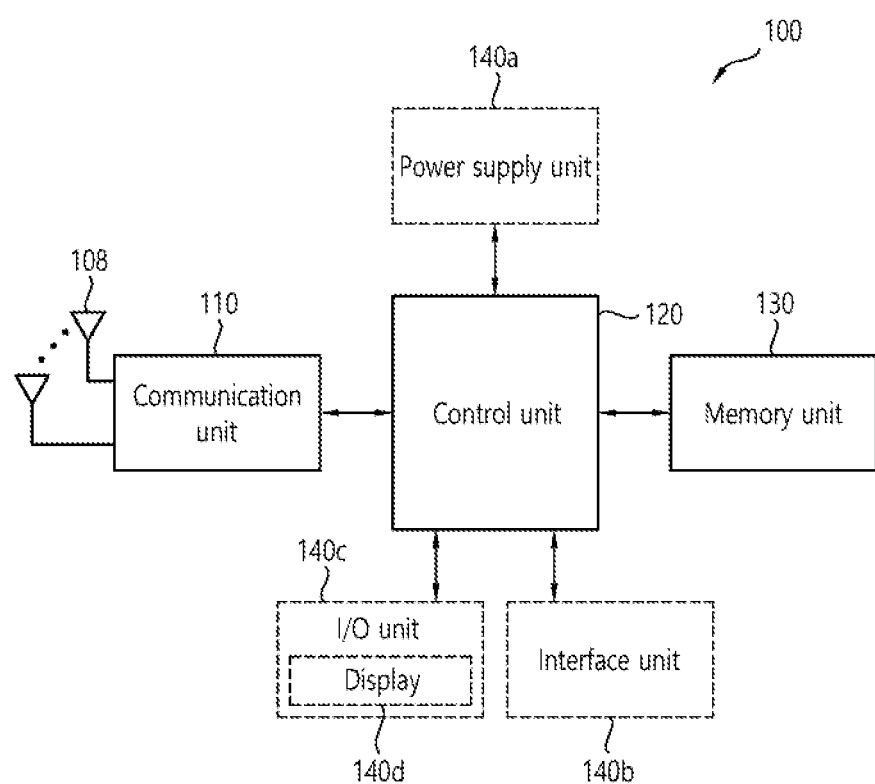
FIG. 20 shows a hand-held device, in accordance with an embodiment of the present disclosure.

FIG. 20 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may obtain information/signals (e.g., touch, text, voice, images, or video) input by a user and the obtained information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
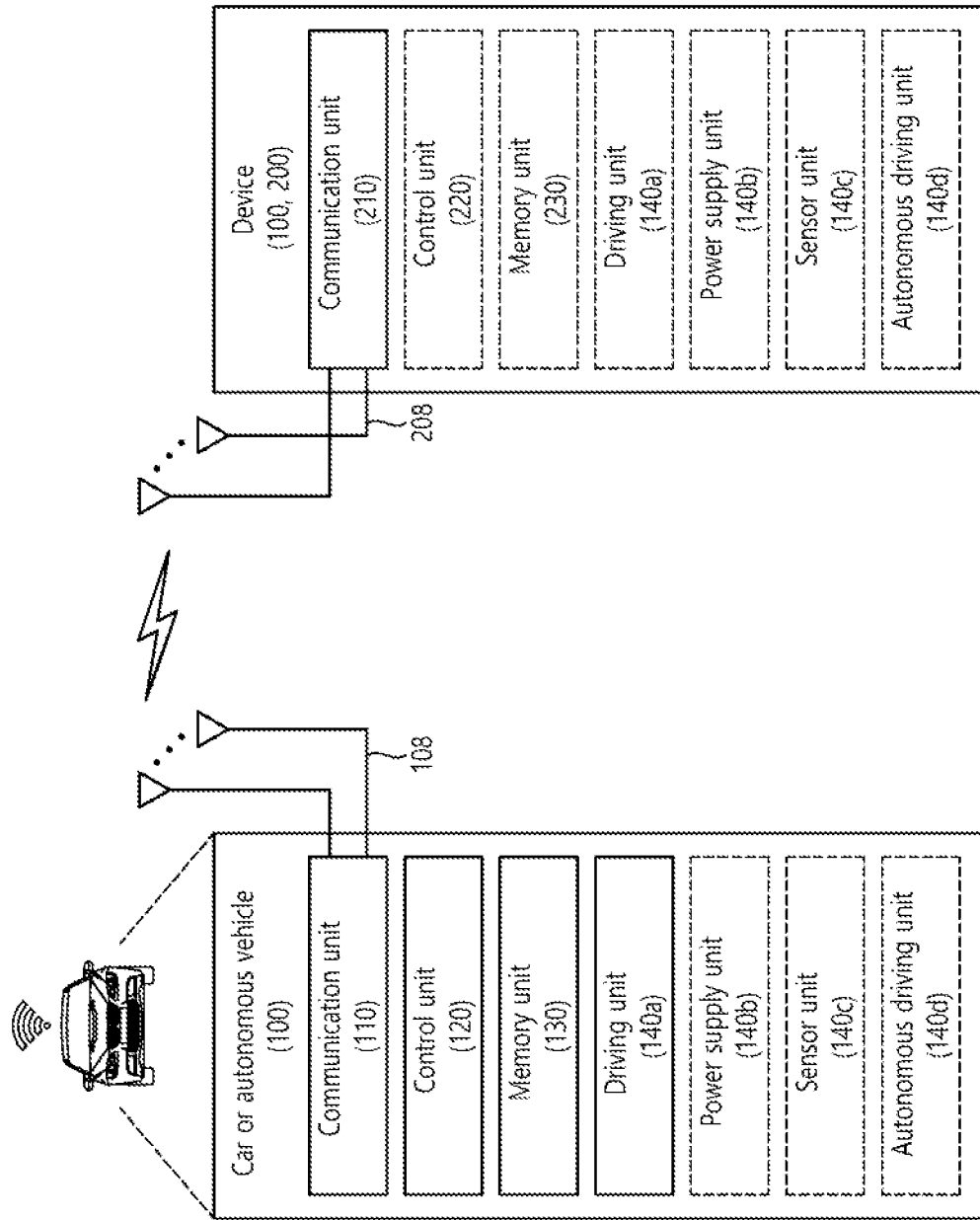
FIG. 21 shows a vehicle or an autonomous vehicle, in accordance with an embodiment of the present disclosure.

FIG. 21 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may obtain a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically obtain recent traffic information data from the external server and obtain surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in a device, and technical features in device claims can be combined to be implemented or performed in a method. Further, technical features in method claim(s) and device claim(s) can be combined to be implemented or performed in a device. Further, technical features in method claim(s) and device claim(s) can be combined to be implemented or performed in a method.

What is claimed is:

1. A method for performing, by a first device, wireless communication, the method comprising:
    receiving a first time division duplex uplink-downlink configuration (TDD UL-DL configuration) related to LTE;
    obtaining a second TDD UL-DL configuration related to NR sidelink communication based on the first TDD UL-DL configuration; and
    performing the NR sidelink communication with a second device on a carrier related to the LTE based on the second TDD UL-DL configuration,
    wherein the first TDD UL-DL configuration includes a UL subframe, a DL subframe and a special subframe,
    wherein the special subframe includes a downlink pilot time slot (Dwpts) symbol, an uplink pilot time slot (Uppts) symbol and a gap symbol, and
    wherein the NR sidelink communication is allowed for the first device in a first symbol, based on the Uppts symbol and the gap symbol related to the first TDD UL-DL configuration overlapping with the first symbol related to the second TDD UL-DL configuration.

2. The method of claim 1, further comprising:
    transmitting, to the second device, a physical sidelink broadcast channel (PSBCH) based on the second TDD UL-DL configuration.

3. The method of claim 1, wherein a numerology of the first TDD UL-DL configuration and a numerology of the second TDD UL-DL configuration are different.

4. The method of claim 3, wherein the numerology of the first TDD UL-DL configuration or the numerology of the second TDD UL-DL configuration includes at least one of sub-carrier spacing or a length of cyclic prefix.

5. The method of claim 3, wherein the NR sidelink communication with the second device performed on the carrier related to the LTE is not deactivated, based on the numerology of the first TDD UL-DL configuration and the numerology of the second TDD UL-DL configuration being different.

6. The method of claim 3, wherein the NR sidelink communication with the second device performed on the carrier related to the LTE is not deactivated, based on Uu communication of the first device with a base station on the carrier related to the LTE being not performed.

7. The method of claim 1, wherein the NR sidelink communication is allowed for the first device in the first symbol, based on Uu communication of the first device with a base station on the carrier related to the LTE being not performed.

8. The method of claim 1, wherein the second TDD UL-DL configuration is obtained based on a UL/DL pattern for the first TDD UL-DL configuration being shifted.

9. The method of claim 7, wherein the first TDD UL-DL configuration is shifted in order of a plurality of second DL subframes, a first DL subframe, the special subframe and the UL subframe, based on the first TDD UL-DL configuration being configured in order of the first DL subframe, the special subframe, the UL subframe and the plurality of the second DL subframes.

10. The method of claim 7, wherein the shifting is performed based on circular shift.

11. The method of claim 1, wherein the NR sidelink communication is not performed, based on the second TDD UL-DL configuration related to the NR sidelink communication cannot being obtained based on the first TDD UL-DL configuration.

12. The method of claim 1, wherein a reference sub-carrier spacing (SCS) value of the first device is configured equal to an SL SCS, based on the first device being a UE out of coverage of a base station.

13. The method of claim 12, wherein the reference SCS is pre-configured to the first device.

14. A first device for performing wireless communication, the first device comprising:
one or more memories storing instructions;
one or more transceivers; and
one or more processors connected to the one or more memories and the one or more transceivers, wherein the one or more processors execute the instructions to:
receive a first time division duplex uplink-downlink configuration (TDD UL-DL configuration) related to LTE;
obtain a second TDD UL-DL configuration related to NR sidelink communication based on the first TDD UL-DL configuration; and
perform the NR sidelink communication with a second device on a carrier related to the LTE based on the second TDD UL-DL configuration,
wherein the first TDD UL-DL configuration includes a UL subframe, a DL subframe and a special subframe,
wherein the special subframe includes a downlink pilot time slot (Dwpts) symbol, an uplink pilot time slot (Uppts) symbol and a gap symbol, and
wherein the NR sidelink communication is allowed for the first device in a first symbol, based on the Uppts symbol and the gap symbol related to the first TDD UL-DL configuration overlapping with the first symbol related to the second TDD UL-DL configuration.

15. A device adapted to control a first user equipment (UE), the device comprising:
one or more processors; and
one or more memories operably connectable to the one or more processors and storing instructions, wherein the one or more processors execute the instructions to:
receive a first time division duplex uplink-downlink configuration (TDD UL-DL configuration) related to LTE;
obtain a second TDD UL-DL configuration related to NR sidelink communication based on the first TDD UL-DL configuration; and
perform the NR sidelink communication with a second UE on a carrier related to the LTE based on the second TDD UL-DL configuration,
wherein the first TDD UL-DL configuration includes a UL subframe, a DL subframe and a special subframe,
wherein the special subframe includes a downlink pilot time slot (Dwpts) symbol, an uplink pilot time slot (Uppts) symbol and a gap symbol, and
wherein the NR sidelink communication is allowed for the first UE in a first symbol, based on the Uppts symbol and the gap symbol related to the first TDD UL-DL configuration overlapping with the first symbol related to the second TDD UL-DL configuration.

* * * * *